(12) United States Patent
Eliaz

(10) Patent No.: US 8,559,498 B1
(45) Date of Patent: Oct. 15, 2013

(54) DECISION FEEDBACK EQUALIZER UTILIZING SYMBOL ERROR RATE BIASED ADAPTATION FUNCTION FOR HIGHLY SPECTRALLY EFFICIENT COMMUNICATIONS

(71) Applicant: MagnaCom Ltd., Moshav Ben Shamen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,026

(22) Filed: Jan. 31, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H03H 7/30* (2006.01)

(52) U.S. Cl.
USPC ......................................................... 375/233

(58) Field of Classification Search
None
See application file for complete search history.

(56) References Cited

U.S. PATENT DOCUMENTS

| | | | |
|---|---|---|---|
| 5,602,507 A * | 2/1997 | Suzuki | 329/304 |
| 2010/0329325 A1* | 12/2010 | Mobin et al. | 375/232 |
| 2012/0207248 A1* | 8/2012 | Ahmed et al. | 375/340 |

OTHER PUBLICATIONS

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Equalization: The Correction and Analysis of Degraded Signals, White Paper, Agilent Technologies, Ransom Stephens V1.0, Aug. 15, 2005 (12 pages).

(Continued)

*Primary Examiner* — Leon-Viet Nguyen
(74) *Attorney, Agent, or Firm* — McAndrews, Held & Malloy, Ltd.

(57) ABSTRACT

One or more embodiments describe a decision feedback equalizer utilizing symbol error rate biased adaptation function for highly spectrally efficient communications. A method may be performed in a decision feedback equalizer (DFE). The method may include determining values of tap coefficients used by the DFE based. The tap coefficients may be determined based on an error signal that is based on an estimated inter-symbol-correlated (ISC) signal. The tap coefficients may be determined based on a set of error vector(s), where each error vector in the set represents a difference between estimated symbols generated in the receiver and expected symbols. Determining the values of the tap coefficients may include using a symbol error rate function that estimates the actual symbol error rate in the receiver, wherein the symbol error rate function receives as input the set of error vector(s).

30 Claims, 13 Drawing Sheets

(56) References Cited

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).
Intuitive Guide to Principles of Communications, www.complextoreal.com, Inter Symbol Interference (ISI) and Root-raised Cosine (RRC) filtering, (2002), pp. 1-23 (23 pages).
Chan, N., "Partial Response Signaling with a Maximum Likelihood Sequence Estimation Receiver" (1980). Open Access Dissertations and Theses. Paper 2855, (123 pages).
The Viterbi Algorithm, Ryan, M.S. and Nudd, G.R., Department of Computer Science, Univ. of Warwick, Coventry, (1993) (17 pages).
R. A. Gibby and J. W. Smith, "Some extensions of Nyquist's telegraph transmission theory," Bell Syst. Tech. J., vol. 44, pp. 1487-1510, Sep. 1965.
J. E. Mazo and H. J. Landau, "On the minimum distance problem for faster-than-Nyquist signaling," IEEE Trans. Inform. Theory, vol. 34, pp. 1420-1427, Nov. 1988.
D. Hajela, "On computing the minimum distance for faster than Nyquist signaling," IEEE Trans. Inform. Theory, vol. 36, pp. 289-295, Mar. 1990.
G. Ungerboeck, "Adaptive maximum-likelihood receiver for carrier modulated data-transmission systems," IEEE Trans. Commun., vol. 22, No. 5, pp. 624-636, May 1974.
G. D. Forney, Jr., "Maximum-likelihood sequence estimation of digital sequences in the presence of intersymbol interference," IEEE Trans. Inform. Theory, vol. 18, No. 2, pp. 363-378, May 1972.
A. Duel-Hallen and C. Heegard, "Delayed decision-feedback sequence estimation," IEEE Trans. Commun., vol. 37, pp. 428-436, May 1989.
M. V. Eyubog •Iu and S. U. Qureshi, "Reduced-state sequence estimation with set partitioning and decision feedback," IEEE Trans. Commun., vol. 36, pp. 13-20, Jan. 1988.
W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.
W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.
Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

* cited by examiner

DECISION FEEDBACK EQUALIZER UTILIZING SYMBOL ERROR RATE BIASED ADAPTATION FUNCTION FOR HIGHLY SPECTRALLY EFFICIENT COMMUNICATIONS

CLAIM OF PRIORITY

This patent application makes reference to, claims priority to and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

Each of the above stated applications is hereby incorporated herein by reference in its entirety.

INCORPORATION BY REFERENCE

This patent application also makes reference to:

U.S. patent application Ser. No. 13/754,964 titled "Low-Complexity, Highly-Spectrally-Efficient Communications," and filed on the same date as this application;

U.S. patent application Ser. No. 13/754,998 titled "Design and Optimization of Partial Response Pulse Shape Filter," and filed on the same date as this application;

U.S. patent application Ser. No. 13/755,001 titled "Constellation Map Optimization For Highly Spectrally Efficient Communications," and filed on the same date as this application;

U.S. patent application Ser. No. 13/755,008 titled "Dynamic Filter Adjustment for Highly-Spectrally-Efficient Communications," and filed on the same date as this application;

U.S. patent application Ser. No. 13/755,011 titled "Timing Synchronization for Reception of Highly-Spectrally-Efficient Communications," and filed on the same date as this application;

U.S. patent application Ser. No. 13/755,014, titled "Signal Reception Using Non-linearity-compensated, partial response feedback," and filed on the same date as this application;

U.S. patent application Ser. No. 13/755,018 titled "Feed Forward Equalization for Highly-Spectrally-Efficient Communications," and filed on the same date as this application;

U.S. patent application Ser. No. 13/755,021 titled "Decision Feedback Equalizer for Highly-Spectrally-Efficient Communications," and filed on the same date as this application;

U.S. patent application Ser. No. 13/755,026 titled "Decision Feedback Equalizer Utilizing Symbol Error Rate Biased Adaptation Function for Highly-Spectrally-Efficient Communications," and filed on the same date as this application;

U.S. patent application Ser. No. 13/755,028 titled "Coarse Phase Estimation for Highly-Spectrally-Efficient Communications," and filed on the same date as this application;

U.S. patent application Ser. No. 13/755,039 titled "Fine Phase Estimation for Highly Spectrally Efficient Communications," and filed on the same date as this application;

U.S. patent application Ser. No. 13/755,043 titled "Joint Sequence Estimation of Symbol and Phase with High Tolerance of Nonlinearity," and filed on the same date as this application.

Each of the above stated applications is hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for low-complexity, highly-spectrally efficient communications, substantially as illustrated by and/or described in connection with at least one of the figures, as set forth more completely in the claims.

DETAILED DESCRIPTION

The present disclosure describes a decision feedback equalizer utilizing symbol error rate biased adaptation function for highly-spectrally-efficient communications. As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As utilized herein the terms "dynamic," "dynamically," "adaptive," "adaptively" and the like may refer to values, parameters and/or the like that may be set, configured or updated during run-time of the transmitter and/or receiver (e.g., in, or near, real-time) based, for example, on recently received signals/values and/or signals/values currently being received.

Figure 1:
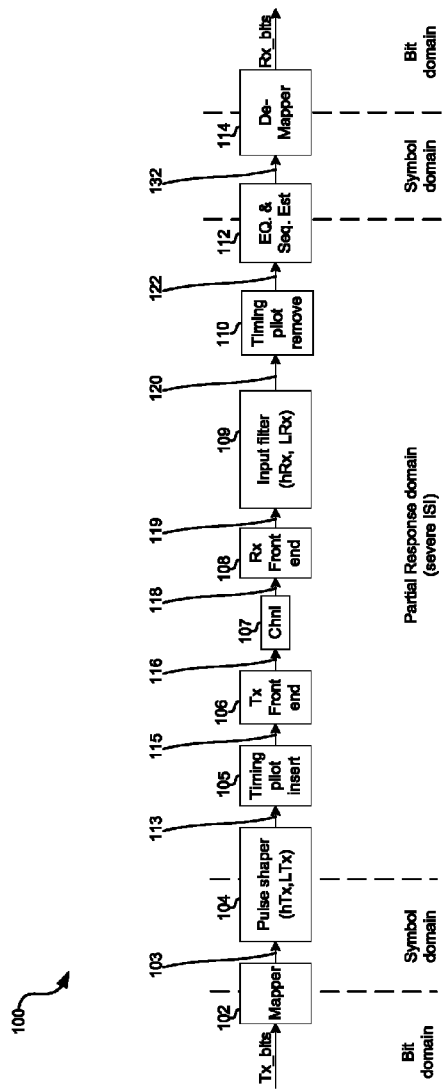
FIG. 1 is a block diagram depicting an example system configured for highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\widehat{Fnl}$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $Log_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) dedecoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

$P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
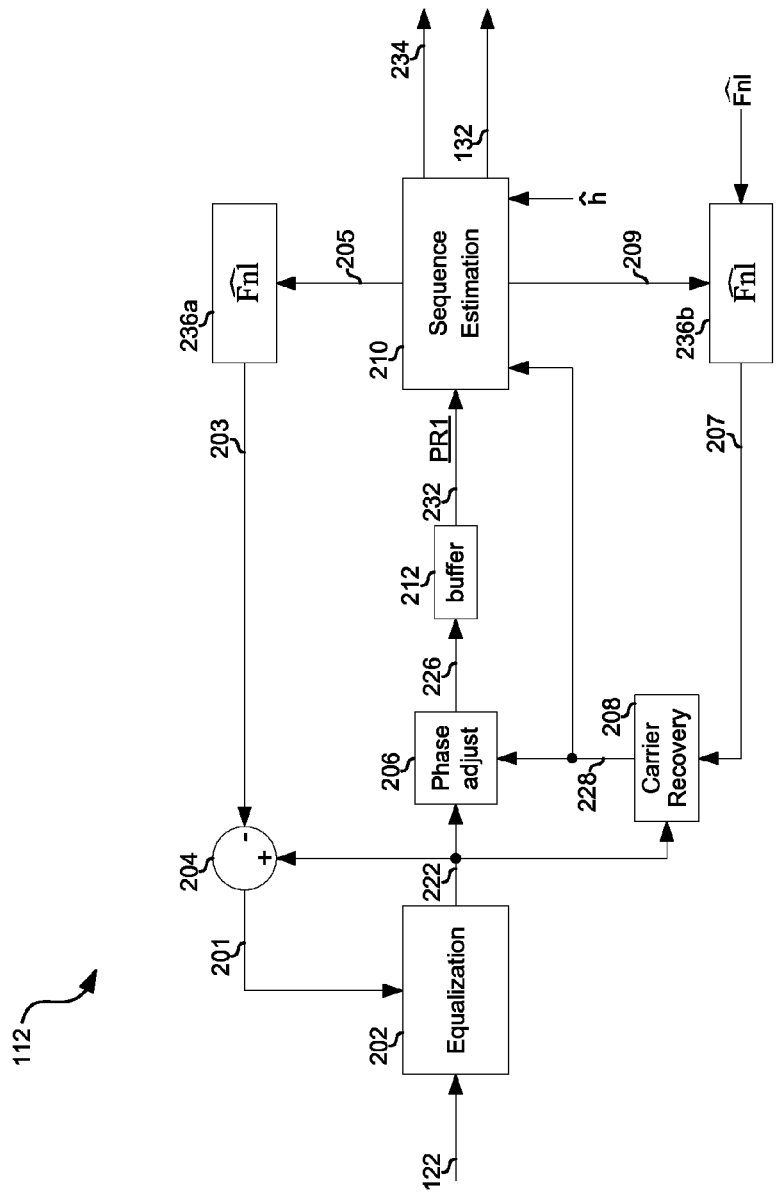
FIG. 2 is a block diagram depicting an example equalization and sequence estimation circuit for use in a system configured for highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response $\hat{h}$. Response $\hat{h}$ is based on h (the total partial response, discussed above). For example, response $\hat{h}$ may represent a compromise between h (described above) and a filter response that compensates for channel non-idealities such as multi-path. The response $\hat{h}$ may be conveyed and/or stored in the form of LTx+LRx−1 tap coefficients resulting from convolution of the LTx tap coefficients of the pulse shaper 104 and the LRx tap coefficients of the input filter 109. Alternatively, response $\hat{h}$ may be conveyed and/or stored in the form of fewer than LTx+LRx−1 tap coefficients—for example, where one or more taps of the LTx and LRx is ignored due to being below a determined threshold. The sequence estimation circuit 210 may output partial response signals 205 and 209, a signal 234 that corresponds to the finely determined phase error of the signal 120, and signal 132 (which carries hard and/or soft estimates of transmitted symbols and/or transmitted bits). One or more example implementations of the sequence estimation circuit 210 and/or various other aspects/embodiments of the sequence estimation circuit may be described in one or more of: the United States patent application titled "Low-Complexity, Highly-Spectrally-Efficient Communications," the United States patent application titled "Signal Reception Using Non-linearity-compensated, partial response feedback," the United States patent application titled "Fine Phase Estimation for Highly Spectrally Efficient Communications," and the United States patent application titled "Joint Sequence Estimation of Symbol and Phase with High Tolerance of Nonlinearity," each of which is incorporated by reference herein, as set forth above.

The non-linear modeling circuit 236a may apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207. $\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities.

Figure 3:
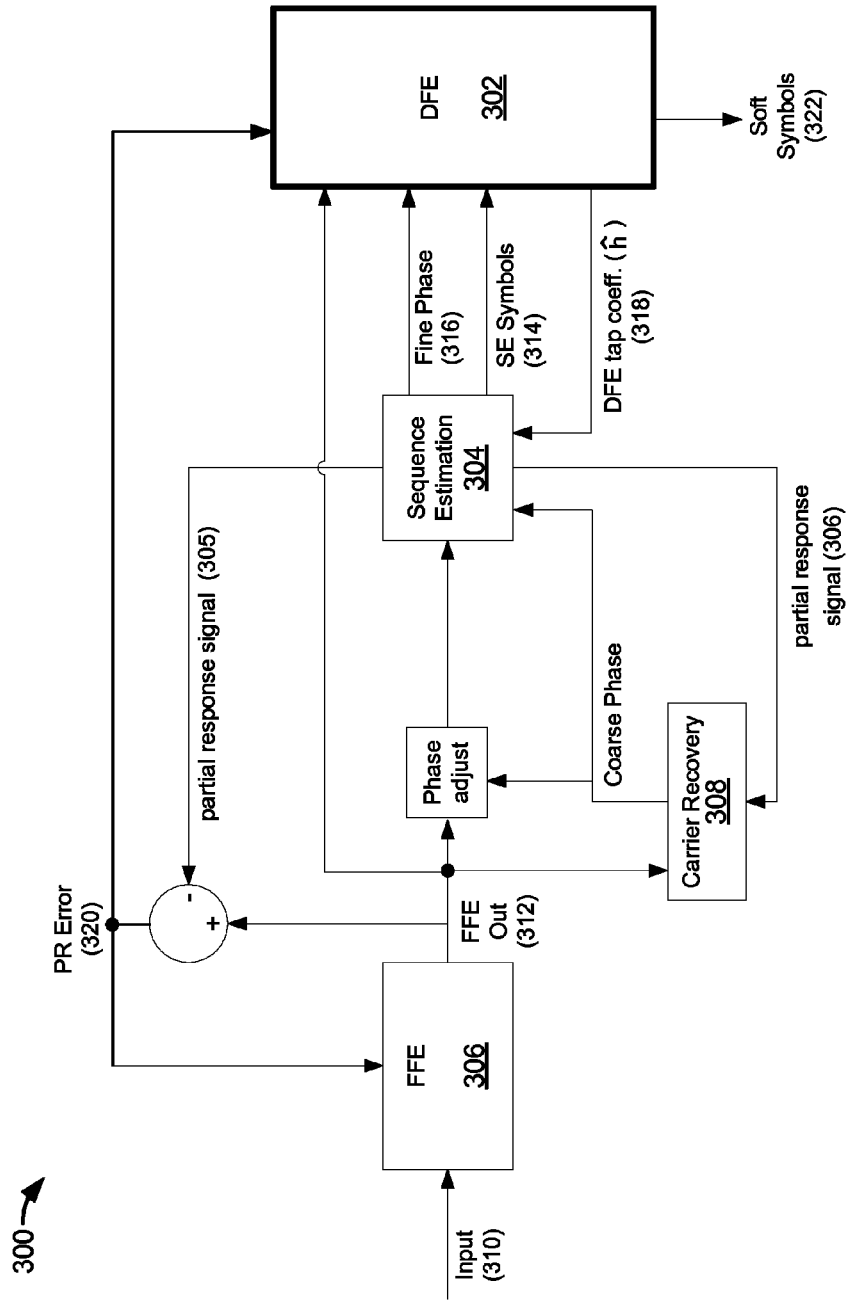
FIG. 3 is a block diagram depicting an example equalization and sequence estimation circuit for use in a system configured for highly-spectrally-efficient communications.

FIG. 3 is a block diagram depicting an example equalization and sequence estimation (ESE) circuit 300 for use in a system configured for highly-spectrally-efficient communications. ESE 300 may be similar to the equalization and sequence estimation circuit 112 of FIG. 2, for example. As can be seen by comparing FIG. 2 and FIG. 3, several components and connections are similar (e.g., sequence estimation, carrier recovery, etc.). FIG. 3 may be simplified from FIG. 2 in various respects in order to focus on particular example implementations of FIG. 3 and subsequent figures. For example, FIG. 3 does not show a buffer at the output of the phase adjust (e.g., buffer 212 of FIG. 2) nor non-linear modeling circuits (e.g., circuits 236a and 236b of FIG. 2). These components may be excluded in FIG. 3 to focus on additional features of particular example implementations of equalization and sequence estimation circuits that follow. However, it should be understood that the embodiments of FIG. 3 and other embodiments described herein may include these components (e.g., buffer, non-linear modeling circuits, etc.). To the extent that similar components and connections are labeled differently in FIG. 3 than they are in FIG. 2, the labels of FIG. 3 will generally be used going forward, as the descriptions that follow may refer to particular example implementations of (and additions to) the general circuit described in FIG. 2.

ESE circuit 300 may include a DFE (Decision Feedback Equalizer) 302. As shown in FIG. 3, DFE 302 may be in communication with a sequence estimation circuit 304, with an FFE (Feed Forward Equalizer) 306 (or other type of equalizer) and/or optionally with other circuits. Sequence estimation circuit 304 may be similar to sequence estimation circuit 210 of FIG. 2, and FFE 306 may be similar to equalizer 202 of FIG. 2, for example. It should be understood that although various descriptions herein may refer to FFE 306 as one example type of equalizer, other equalizers may be used, and descriptions herein that use FFE may be expanded to use any type of equalizer. FFE 306 may receive an input signal 310 (e.g., similar to signal 122 of FIG. 2) and may generate an FFE out signal 312 (e.g., similar to signal 222 of FIG. 2).

DFE 302 may receive symbols (e.g., SE symbols 314) from the sequence estimation circuit 304. SE symbols 314 may be a similar signal to signal 132 of FIG. 2, for example. These SE symbols 314 may be the same symbols that are output by the ESE circuit 300 (e.g., sent to de-mapper 114 of FIG. 1). DFE 302 may receive a fine phase signal 316 from the sequence estimation circuit 304. Fine phase 316 may be a similar signal to signal 234 of FIG. 2, for example. Signals received by the receiver may have been phase distorted, for example, by the channel. Fine phase 316 may represent the overall phase compensation/correction required to compensate for phase error in a received input signal (e.g., input to FFE 306). Throughout this disclosure, a received signal (e.g., at the input 310 to FFE 306) will be considered to have zero phase error, and unless otherwise specified, the terms "performing or applying a phase rotation," "performing or applying a phase correction," "phase rotated," "phase corrected" or the like will refer to correcting a signal or a corrected signal.

DFE 302 may send a number of tap coefficients (e.g., DFE taps coefficients 318, or generally represented by ĥ) to the sequence estimation circuit 304. The ĥ signal of FIG. 3 may be similar to the ĥ signal of FIG. 2, for example. The DFE taps may be used by the sequence estimation circuits to perform various aspects (routines, calculations, algorithms, etc.) of the symbol estimation process. Various aspects (e.g., symbol detection routines, calculations and/or algorithms) of one or more sequence estimation process may be described in one or more of: the United States patent application titled "Low-Complexity, Highly-Spectrally-Efficient Communications," the United States patent application titled "Signal Reception Using Non-linearity-compensated, partial response feedback," the United States patent application titled "Fine Phase Estimation for Highly Spectrally Efficient Communications," and the United States patent application titled "Joint Sequence Estimation of Symbol and Phase with High Tolerance of Nonlinearity," each of which is incorporated by reference herein, as set forth above.

DFE 302 may receive an FFE out signal 312 from FFE 306. FFE 306 may have equalized the input signal 310 to compensate for channel response (e.g., multipath and/or other channel distortions). DFE 302 may receive a PR error signal 320 as shown in FIG. 3. PR error 320 may be similar to signal 201 of FIG. 2, for example. The PR error signal 320 may be based on a partial response signal 305 generated by the sequence estimation circuit 304. Signal 305 may be a signal that estimates the total partial response signal (e.g., the transmitted symbols after they pass through a Tx partial response filter and/or an Rx filter). Signal 305 may be similar to signal 205 and/or 203 of FIG. 2. DFE 302 may use the PR error signal 320 to generate and/or determine an error signal (e.g., DFE Error 408) for use in the DFE equalizer adaptation.

DFE 302 may output a soft symbols signal 322, as shown in FIG. 3. The soft symbols signal may be comprised of estimated symbols, for example, estimates of symbols that were sent by the transmitter, received by the receiver and/or output (e.g., SE symbols 314) by the ESE circuit 300. The soft symbols signal 322 may be used as a quality indication of the symbols output by the ESE circuit 300. The soft symbols signal 322 may be used by the DFE to generate and/or determine an error signal (e.g., DFE Error 408) for use in the DFE equalizer adaptation.

DFE (Decision Feedback Equalizer) 302 may perform equalization, for example, additional equalization beyond the equalization performed by the FFE 306. For example, the DFE 302 may converge to the overall response at the output of the FFE 306, which may include the response of the Tx partial response pulse shape filter, the response of the Rx filter, any residual channel response (e.g., channel response not corrected by the FFE) and/or the response of the FFE 306. In some embodiments, DFE 302 may perform biased equalization. For example, DFE 302 may compromise between optimally equalizing to correct for signal distortions (e.g., distortions due to multipath, etc.) one the one hand and achieving other optimization goals on the other hand. Examples of other optimization goals include, for example, improving sequence estimation (e.g., in sequence estimation circuit 304), improving the minimum distance and SER. The concept of minimum distance is further explained below in the description related to error vectors. The concept of compromising between optimization goals is also further explained below.

Figure 4:
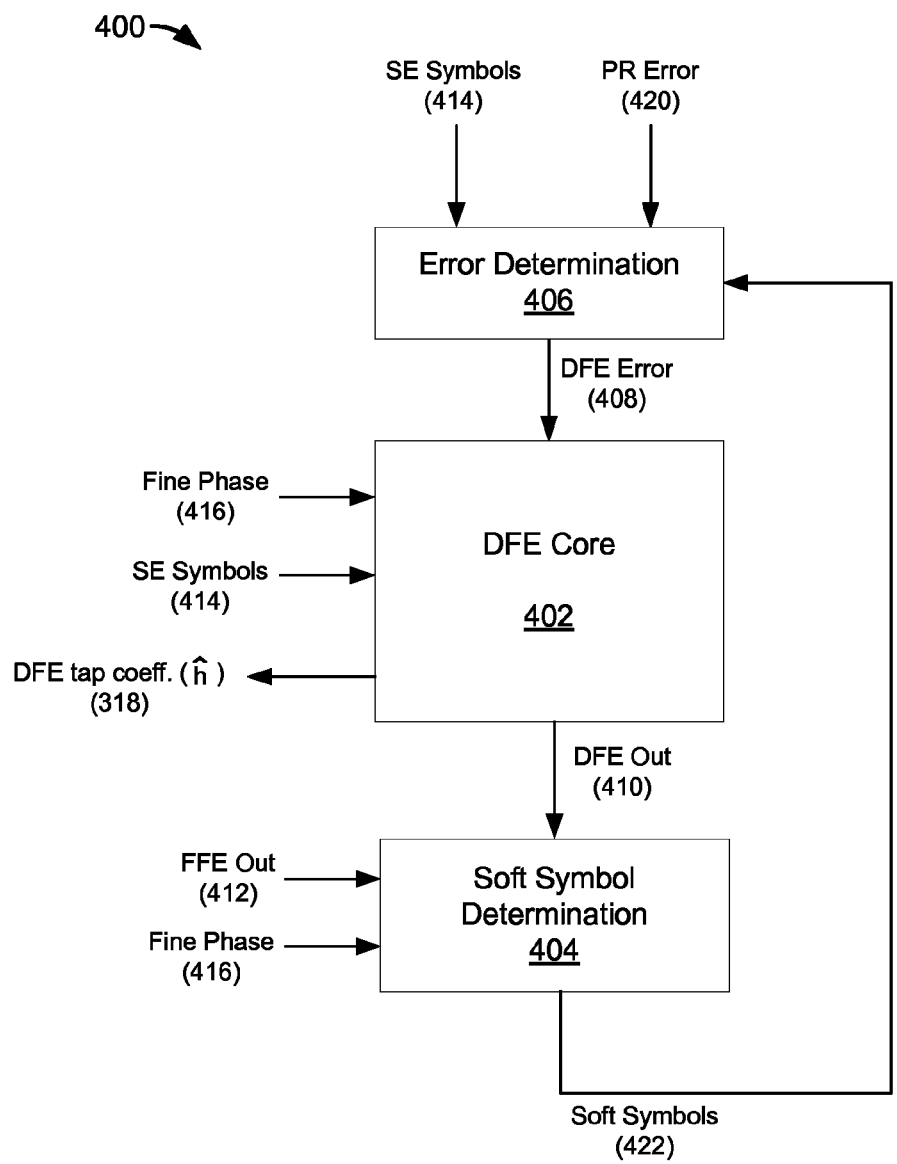
FIG. 4 is a block diagram depicting an example decision feedback equalizer for use in a system configured for highly-spectrally-efficient communications.

FIG. 4 is a block diagram depicting an example decision feedback equalizer (DFE) 400 for use in a system configured for highly-spectrally-efficient communications. DFE 400 may be similar to DFE 302 of FIG. 3, for example. DFE 400 may include a DFE core circuit 402, which is explained in more detail below (e.g., with regard to FIG. 5). DFE 400 may include a soft symbol determination circuit 404. The soft symbol determination unit 404 may receive as inputs DFE out 410, FFE out 412 and, optionally, fine phase 416. The soft symbol determination circuit 404 may output a soft symbols signal 422. The soft symbols signal may comprise estimated symbols, for example, estimates of symbols (e.g., SE symbols) that are output by the ESE circuit 300. The soft symbols signal 422 may be used as a quality indication of the symbols output by the ESE circuit 300. The soft symbols signal 422 may be used by the DFE to generate and/or determine an error signal (e.g., DFE Error 408) for use in the DFE equalizer adaptation. DFE 400 may include an error determination circuit 406. The error determination circuit 406 may generate an error output (e.g., DFE error 408), where the error output may be based on PR error 420, or based on SE symbols 414 and soft symbols 422, or based on other inputs. In some embodiments, the error determination circuit 406 may simply pass the PR error 420 through to the DFE error signal 408. In other embodiments, the error determination circuit may be excluded from the DFE 400, and the PR error signal 420 may be connected directly to the DFE error signal 408.

DFE core circuit 402 may perform equalization, for example, with the goal of cancelling ISI (inter-symbol interference) that exists in the input signal to the ESE circuit. DFE core circuit 402 may receive SE symbols 414 (e.g., from the sequence estimation circuit 304) as input. DFE core circuit 402 may include a number of taps and delays. DFE core circuit 402 may calculate or determine a number of tap coefficients (e.g., DFE tap coefficients 318), for example, to send to the sequence estimation circuit 304. DFE core circuit 402 may include one or more tap update/adaptation units that update the tap coefficients based on various inputs (e.g., based on DFE error 408). DFE core circuit 402 may receive fine phase 416 as an input, and may use fine phase to phase rotate/correct an error signal (e.g., DFE error 408). Fine phase 416 may be generated by the sequence estimation circuit and may represent the overall phase compensation/correction required to compensate for phase error in a received input signal (e.g., input to FFE 306).

Figure 5:
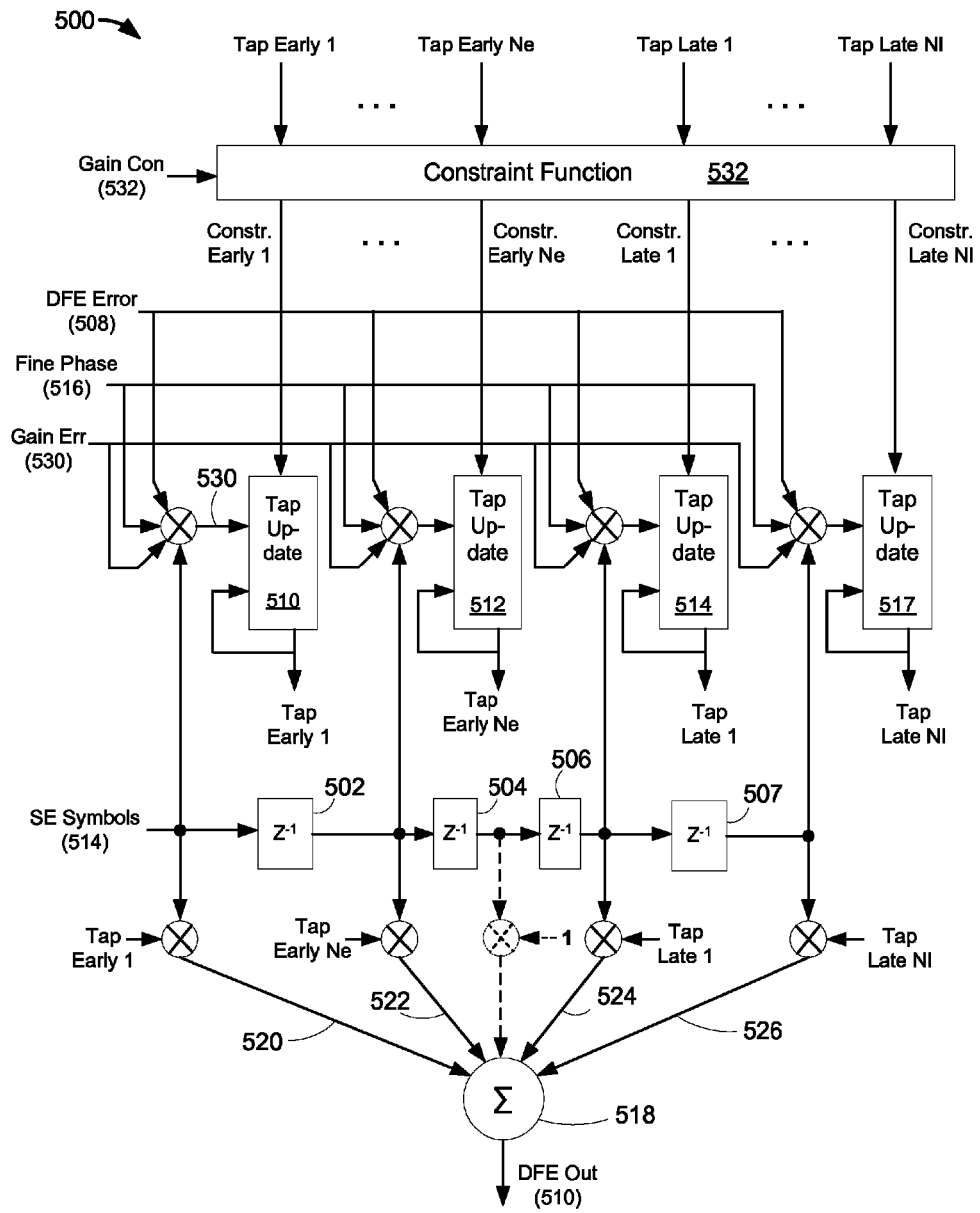
FIG. 5 is a block diagram depicting an example decision feedback equalizer core circuit.

FIG. 5 is a block diagram depicting an example DFE core circuit 500. DFE core circuit 500 may be similar to DFE core circuit 402 of FIG. 4, for example. DFE core circuit 500 may receive SE symbols 514 as an input and may include a number of delay elements (e.g., Z transform delay elements 502, 504, 506, 507), where each delay element may constitute one symbol delay. DFE core circuit 500 may generate a number of tap coefficients, for example, tap coefficients Tap Early 1, Tap Early Ne, Tap Late 1, Tap Late Nl. The tap coefficients may be generated at the outputs of tap update units, for example, tap update units 510, 512, 514, 517. DFE core circuit 500 may output a DFE out signal 510, which may be generated by an accumulator 518. The accumulator 518 may receive as inputs a number of signals (e.g., signals 520, 522, 524, 526), where each signal may be the product of a symbol (e.g., the current input SE symbol 514 or previous input SE symbol that has been delayed by one or more symbol times) and a tap. As one example, input signal 522 may be the product of the delayed symbol between delay units 502 and 504 and the tap coefficient Tap Early Ne. In some embodiments, the aggregator 518 may receive, as an input, a signal based on the '1' tap (or center tap) as shown in FIG. 5. In other embodiments, the aggregator may not receive any input based on the '1' tap (or center tap).

DFE core circuit 500 may generate a number of tap coefficients. In an example implementation, the tap coefficients may be categorized into early tap coefficients (e.g., Tap Early 1, Tap Early Ne) and late tap coefficients (e.g., Tap Late 1, Tap Late Nl), a '1' (or "center") tap coefficient (associated with a tap in the middle of the early taps and the late taps). The 1 tap (or center tap) may relate to the reference symbol. The term reference symbol may refer generally to the symbol being equalized by the DFE at any given time. As one example, the reference symbol in FIG. 5 may refer to the delayed symbol between delay elements 504 and 506. The reference symbol may also be referred to as the "cursor". From the standpoint of an equalizer (e.g., the DFE core circuit 500), the early taps may compensate for pre-cursor interference, and the late taps may compensate for post-cursor interference. It should be understood that although FIG. 5 shows four taps in the DFE core circuit, the DFE core circuit 500 may include more or less taps (e.g., more taps between the tap associated with coefficient Tap Early 1 and the tap associated with coefficient Tap Early Ne, and/or more taps between the tap associated with Tap Late 1 and the tap associated with coefficient Tap Late Nl). For each tap of the DFE core circuit 500, the DFE core circuit may include an associated delay element and tap update unit. It may be said that the delay element and current tap coefficient associated with a particular tap constitutes a part of the DFE response, where all of the response parts together constitute the total response of the DFE core 500 or the DFE (e.g., DFE 400).

In some embodiments, the response (e.g., $\hat{h}$) of the DFE (e.g., DFE 400) may replicate or approximate the total partial response (h) of the system. The "total partial response" (h) may include the response of the Tx partial response filter and/or the response of the Rx filter. The phrase "partial response filter" used generally without reference to the Tx or Rx may refer to the Tx partial response filter and/or the Rx filter. In other words, the total partial response (h) may be split between the Tx partial response filter and the Rx filter, where $h_{Tx}$ may represent the component associated with the Tx partial response filter and $h_{Rx}$ may represent the component associated with the Rx filter. More specifically, the total partial response (h) may be the convolution of the Tx partial response ($h_{Tx}$) and the Rx partial response ($h_{Rx}$), i.e., h=conv($h_{Tx}$, $h_{Rx}$). Then, $\hat{h}$ may be an estimate of h. If h were to exactly match h, the number of taps (L) in the DFE core 500 would be equal to LTx+LRx−1, where LTx is the number of taps of the Tx partial response filter and LRx is the number of taps of the Rx filter. Similarly, if $\hat{h}$ were to exactly match h, the tap coefficients in the DFE would be precisely determined by $\hat{h}$=h=conv($h_{Tx}$, $h_{Rx}$). In some embodiments, one or more of the taps of the Tx partial response filter may be ignored or omitted in determining the number and/or coefficients of taps in the DFE (in such an embodiment L would be less than LTx+LRx−1). For example, in some embodiments, certain taps of the Tx partial response filter and/or of the Rx filter that have coefficients that are below a determined threshold (and, consequently, that will have little effect on the decoding performance of the ESE) may be ignored when determining the number and/or coefficients of taps in the DFE. In some examples, pre-cursor taps may be ignored so that the amplitude of first pre-cursor tap in the DFE will be large enough to assure reliable sequence estimation.

In some embodiments, the sequence estimation circuit (e.g., 304) may use the DFE tap coefficients (i.e., the tap coefficients corresponding to $\hat{h}$). The sequence estimation circuit may assume that $\hat{h}$ is close to the total partial response of the system (e.g., h). In order to configure or initialize the DFE (e.g., 302) to replicate or approximate the total partial response, the tap coefficients of the DFE may be set or initialized to be equal to (or close to) tap coefficients corresponding to the total partial response (i.e., the tap coefficients of the Tx partial response filter convolved with the tap coefficients of the Rx partial response filter). In this respect, it may be said that the DFE taps to the left of the reference symbol (the "early taps") represent the leading part (e.g., pre-cursor) of the total partial response, and the DFE taps to the right of the reference symbol (the "late taps") represent the trailing part (e.g., post-cursor) of the total partial response. It may be the case that the total partial response (e.g., the response of the Tx partial response pulse shape filter convolved with the response of the Rx filter) varies (e.g., is not static). For example, the Tx and Rx filters may be optimized during run-time based on various factors. For example, the Tx and Rx filters may be optimized using error vectors, for example, in a similar manner to the way some implementations of the DFE core 500 may use error vectors, as explained below. If the total partial response (h) varies, the taps coefficients in DFE core 500 may vary as well such that, for example, DFE core 500 continues to replicate or approximate the total partial response (e.g., within a determined error bound). In some embodiments, the input symbols to the DFE may be decimated down, or up sampled, to the symbol rate, for example, by passing the input symbols through an up/down sampler at the input of the DFE core circuit. This decimation may be required, for example, if the Tx partial response filter and the Rx filter are sampling at higher or lower rates than the symbol rate.

In some embodiments, the DFE core 500 may be initialized or calibrated to replicate or approximate the total partial response of the system (h). This initialization/calibration may occur at various times, for example, at one or more of: power up of the system, upon receiving each packet of data (e.g., at the beginning of the packet), at the beginning of a packet stream, upon receiving a preamble, on every X (an integer) iterations of the sequence estimation process performed by the sequence estimation circuit. After initialization, the DFE core 500 may adapt/update to achieve a compromise between multiple optimization goals. In other words, the DFE core may perform biased equalization. The adaptation of the DFE core may compromise between optimally equalizing to correct for signal distortions (e.g., distortions due to multipath, AWGN, etc.) on one hand, and achieving other optimization goals on the other hand. Examples of other optimization goals include, improving sequence estimation (e.g., in sequence estimation circuit 304) and improving the minimum distance and/or SER. The concept of minimum distance is explained below along with the description of error vectors. In an example implementation, if the channel was perfect (e.g., without distortion, multipath, ISI, etc.), then the DFE core's primary purpose would be to replicate or approximate the total partial response of the system (h) such that, for example, the sequence estimation circuit may perform optimal symbol detection. This situation may be thought of as one extreme of the compromise. On the other hand, if the DFE was not concerned with providing $\hat{h}$ (an approximation of h) to the sequence estimation unit, then the DFE core's primary purpose would be to equalize for channel distortions (e.g., multipath, ISI from the channel, etc.). This situation may be thought of as the other extreme of the compromise. In some embodiments, the DFE core (e.g., DFE core 500 shown in FIG. 5) may compromise between the two extremes, for example, by equalizing to correct for channel distortions while biasing that equalization goal to also provide an acceptable approximation of h. This biasing may also be thought of as biasing or pushing the pure LMS solution/adaptation (explained more below) to also achieve acceptable symbol detection. Biasing or pushing the LMS solution may be done by using the constraint function 532, or alternatively, by using an SER (symbol error rate) to bias the adaptation (explained more below). Alternatively, as further explained below (e.g., with respect to FIG. 9), the DFE may include multiple DFE cores/sets of DFE tap coefficients, where each DFE core seeks to achieve a different optimization goal.

The tap coefficients in the DFE core circuit 500 may be scaled or normalized. For example, the tap coefficients may be normalized to a maximum value of 1, where the maximum tap coefficient of 1 may be associated with the center '1' tap. It should be understood that the taps may be normalized to any value, for example, values other than 1. Additionally, the '1' tap (or center tap) as shown in FIG. 5 may be any other value, for example, a static or fixed value. The normalization value may be determined by the power level at the input to the DFE. In some embodiments, the taps may be scaled such that some or all of the "early" taps have at least a minimum amplitude (e.g., a defined value), which may improve performance of the sequence estimation circuit. As explained above, the '1' tap (or center tap) may be associated with the reference symbol, and it may be located between the early taps of the DFE and the late taps of the DFE. In some embodiments, the '1' tap (or center tap) may not be used to generate the DFE out signal (e.g., used for ISI cancellation and/or determining soft symbols). As one example, by excluding the 1' tap (or center tap) and the reference symbol from the aggregator 518 and the DFE out 510 calculation, the DFE out signal 510 may be comprised of solely, or mainly, ISI components. In this respect the DFE out signal may be used to cancel ISI from a related signal that includes ISI components.

The DFE tap coefficients (e.g., Tap Early 1, Tap Early Ne, the '1' Tap, Tap Late 1, Tap Late Nl) may be sent to the sequence estimation circuit (e.g., 304). The sequence estimation circuit may perform one or more routines, algorithms or the like that assume that ĥ (the DFE tap coefficients) is close to the total partial response (i.e., h) of the system (e.g., the Tx partial response filter and the Rx filter). Referring to the embodiment of FIG. 5, the DFE tap coefficients may be initialized to total partial response, but the DFE core circuit 500 may update the taps to achieve (e.g., to a certain extent) various optimization goals (e.g., to compensate for channel distortion such as multipath). In perfect channel conditions the DFE tap coefficients values would correspond to the total partial response (h). In non-perfect channel conditions the DFE core circuit 500 may adapt to achieve various optimization goals (e.g., to compensate for multipath distortion).

DFE core circuit 500 may include one or more tap update/adaptation units (e.g., tap update units 510, 512, 514) that update the tap coefficients based on various inputs, for example, DFE error 508, fine phase 516 and/or Gain Err 530. It should be understood that in some embodiments, the tap update units may be combined into a single unit instead of being configured as discrete units as shown in FIG. 5. The DFE Error signal 508 may be determined by an error determination circuit (e.g., circuit 406 of FIG. 4) or DFE error 508 may be the PR error 320 as shown in FIG. 3. If the DFE error 508 is the PR error, the DFE core circuit 500 may phase correct/rotate the DFE error signal (e.g., using the fine phase signal 516). This phase correction of DFE error may be required such that DFE error 508 is phase aligned with the SE symbols 514, which have been generated using a phase corrected signal. This phase correction may be possible because PR error (e.g., 320) is in the signal domain (as opposed to the symbol domain), which means that PR error includes ISI, as does the signal (e.g., FFE out 312) used by the carrier recovery circuit and the sequence estimation circuit (e.g., carrier recovery circuit 308 and sequence estimation circuit 304 of FIG. 3) to calculate the phase correction signal. In some embodiments and/or situations, the DFE error may be a symbol error (i.e., a signal that lives in the symbol domain). In these embodiments and/or situations, the phase correction may not be performed (e.g., the fine phase signal may not be used and/or received).

As explained above, in some situations (e.g., perfect channel conditions) the DFE taps coefficients may hold at the total partial response values. In other situations, the tap coefficients may update or adapt. This updating/adaptation may also be referred to as convergence, for example, if the tap coefficients are approaching optimal values. The DFE core circuit 500 may adapt/converge using one or more adaptation functions (e.g., cost functions such as Least Mean Square-error or "LMS"). As one example, and referring to FIG. 5, each tap update unit (e.g., tap update units 510, 512, 514, 517) may include an aggregator or integrator that utilizes an adaption function (e.g., a cost function such as LMS). As one example, tap update unit 510 may include an "early 1 adaptation function" that receives as inputs the current tap coefficient (e.g., Tap Early 1), an adaptation error signal 530 (e.g., the phase shifted, and optionally, gain adjusted, DFE error signal 508 multiplied by the associated symbol) and, optionally, a constraint (e.g., Constraint Early 1). Generally speaking, the early 1 adaptation function may determine (e.g., dynamically, continuously or repeatedly) an optimal or enhanced Tap Early 1 value such that the adaptation error signal becomes minimized. As shown in FIG. 5, the tap coefficients (e.g., Tap Early 1) may directly loop back into the adaptation functions (e.g., the early 1 adaptation function). Alternatively or additionally, the tap coefficients may loop back into the adaptation functions by way of their use by the sequence estimation circuit in generating a signal (e.g., signal 305 in FIG. 3) which is used to generate the PR error (e.g., 320) signal, which, in turn, is used to generate the DFE error signal (e.g., 408). In this respect, the error signal used by the DFE core 500 (e.g., DFE error 508) may be referred to as a "loop error."

The adaptation functions may minimize the square error of the adaptation error signals (e.g., adaptation error signal 530). If the DFE error 508 is the PR error (e.g., 320), then the adaptation functions may effectively minimize the PR error. If the DFE error is symbol error (e.g., based on the soft symbols as described herein), then the adaptation functions may effectively minimize symbol error. Therefore, it can be seen that in various embodiments and/or various situations, the adaptation functions (e.g., updating of the taps) may be driven by different error signals. In some situations (e.g., if the DFE error is the PR error), the adaptation function may be driven by PR error (e.g., 320) which is related to an approximation of the total partial response signal (generated by the sequence estimation circuit). This error signal is in the signal domain (as opposed to the symbol domain). In some situations (e.g., if the DFE error is symbol error), the adaptation function may be driven by symbol error which is related to estimated received symbols (generated by the sequence estimation circuit). This error signal is in the symbol domain (verses the signal domain). As explained above, the DFE core 500 may perform biased equalization to achieve multiple optimization goals. In this respect, the adaptation function may be limited or constrained (e.g., by constraint function 532) such that the DFE adaptation does not degrade sequence estimation and/or minimum distance. Alternatively, an SER (symbol error rate) biased adaptation function may be used (explained more below) that considers both the mean square error and the goal of sequence estimation.

In some embodiments, the DFE error 508 may be multiplied by a gain factor (e.g., Gain Err 530 as shown in FIG. 5), which may improve the convergence time of the adaptation function(s). A properly selected gain factor may adapt the DFE core circuit to converge quickly without producing a noisy or distorted DFE out signal 510. For example, if the gain factor is too small, the convergence may not happen quickly, and if the gain factor is too large, the convergence may happen quickly, but the output signal (e.g., DFE out) may have undesirable noise or distortions. The gain factor may be adjusted based on an adaptive function, for example, a symbol counter that counts the number of symbols that have entered the DFE core circuit since a reference point. The gain factor may also be adjusted based on other performance metrics/indicators such as SNR and/or multipath (e.g., as indicated by SNR and/or multipath estimators).

As can be seen in FIG. 5, the tap update units may each receive a constraint, where each constraint may be generated by a constraint function 532. The constraints (e.g., Constraint Early 1, Constraint Early Ne, Constraint Late 1, Constraint Late Nl) may be used by the tap update units to set limits on the adaptation of the DFE core circuit 500. As explained above, the DFE (e.g., 302) may compromise between various optimization goals. If the DFE core circuit 500 were allowed to adapt (e.g., to achieve LMS criteria) without constraint, the DFE out signal 510 may improve from a signal quality standpoint (e.g., corrected for channel distortions), but the tap coefficients (e.g., DFE tap coefficients sent to the sequence estimator) may stray from their initial values (e.g., values corresponding to the total partial response, h). This may reduce the performance of the symbol estimation in the sequence estimator. For example, the minimum distance of the transmitted symbols may degrade, and consequently, symbol error rate may increase. The constraints (e.g., Constraint Early 1, Constraint Early Ne, Constraint Late 1, Constraint Late Nl) may set a limit on DFE adaptation to maintain, restore or improve the minimum distance. In other words, the constraints may allow for $\hat{h}$ to stray from h by only a limited amount (e.g., by a determined threshold amount).

The constraint function 532 may control the impact that the constraints have on the adaptation functions (in the tap update units). Alternatively, control of the impact may be performed by each tap update unit. Control of the impact may depend on an input, for example, Gain Con 532 as shown in FIG. 5. For example, if Gain Con 532 is adjusted in one direction (or set to a first value), the constraints may have less effect on adaptation, and $\hat{h}$ may stray further from h (e.g., $\hat{h}$ may be restricted to within a first determined error bound of h). If Gain Con is adjusted in the other direction (or set to a second value), the constraints may have more of an effect on adaptation, and $\hat{h}$ may remain closer to h e.g., $\hat{h}$ may be restricted to within a second determined error bound of h). Keeping $\hat{h}$ closer to h may limit minimum distance degradation. In some situations, it may be possible to adjust Gain Con to force DFE adaptation to improve the minimum distance in the receiver beyond the minimum distance in the transmitter, but this may result in increased signal distortion (e.g., increased noise, increased values of the PR Error signal, etc.), which may cause less-reliable signal decoding in the equalizer and sequence estimator overall. Gain Con 532 may be static (e.g., configured as part of system calibration) or it may vary dynamically, for example, based on SNR, multipath and/or other system performance metrics/indicators.

As explained above, Gain Con 532 may control the impact of the constraints, and Gain Err 530 may control the impact of the DFE error (e.g., causing faster convergence). Therefore, the ratio of Gain Err to Gain Con may represent the compromise between unconstrained adaptation of the DFE and sequence estimation performance of the sequence estimation circuit. In some embodiments, there may be an optimum level of Gain Con for any particular level of Gain Err that maximizes sequence estimation performance and reduces symbol error rate. This optimum level may be function of multipath, SNR, SER, BER, a measured indication of phase error, a measure indication of sequence estimation reliability, and/or other system performance metrics or other measure performance indicators.

When considering all the inputs that may affect the adaptation functions (e.g., DFE error, Gain Err, Gain Con, the constraints), the tap coefficients may be updated (e.g., dynamically, continuously or repeatedly) based on several metrics that may be important to the performance of the system (e.g., to reliable decoding of incoming signals). Such metrics may include SNR, phase noise, channel conditions and minimal distance reduction. By considering these various metrics when updating the tap coefficients, the DFE is adapted to be a smart and flexible equalization component.

Referring to FIG. 5, the constraint function 532 may generate a number of constraints that may be used by the tap update units to maintain the minimum distance and maintain performance of the sequence estimation circuit. The constraint function 532 may accept as inputs the current tap coefficients (e.g., Tap Early 1, Tap Early Ne, Tap Late 1, Tap Late Nl). The constraint function 532 may accept various other inputs, such as various error vectors (explained more below with regard to the SER-biased adaptation function). The constraint function 532 may use error vectors to calculate the minimum distance, and may compute constraints (e.g., Constraint Early 1, Constraint Early Ne, Constraint Late 1, Constraint Late Nl) that maintain the minimum distance (e.g., within a certain acceptable range). In general, the constraint function may perform computations that are similar to the computations explained below with regard to the SER-biased adaptation function. The constraint function 532 may be adaptive based on other inputs, such as SNR, multipath and/or other system performance metrics. The constraint function may be any type of function. For example, the constraint function may be a linear function, a non-linear function, a limit or constraint calculation, a lookup table or any other type of function.

In some embodiments of the present disclosure, DFE core circuit 500, and tap update units 510, 512, 514 in particular, may utilize an adaptation function that seeks to minimize symbol error rate (SER). Referring to FIG. 5, as explained above, DFE core circuit 500 may include one or more tap update/adaptation units (e.g., tap update units 510, 512, 514). Additionally, as explained above, the constrain function 532 may generate a number of constraints that may be used to set limits on the adaptation. In some embodiments, instead of having a constraint function and constraints fed into the adaptation function(s), the adaptation function(s) may automatically or naturally adapt the DFE tap coefficients according to similar goals and/or principals as used by the constraint function. For example, it may be the case that the optimal taps for correcting for channel distortion (e.g., multipath, etc.) may degrade the performance of the sequence estimation circuit (e.g., degrade the minimum distance). Therefore, the adaptation function may automatically constrain tap coefficients as part of the adaptation to minimize SER. For example, the tap update/adaptation units may adapt/converge according to a cost function such as Least Mean Square-error or "LMS" (as explained above), but the cost function/LMS function may be revised or biased to minimize symbol error rate (SER) and/or to maintain or improve minimum distance. The term "SER-biased adaptation function" may refer to an adaptation function used by one or more tap update/adaptation units, as just explained, and as explained further below. In these embodiments, the DFE core (as shown in FIG. 5) may be modified, for example, to exclude the constraint function 532 and to exclude the constraints feeding into the tap update units.

The following describes one example SER-biased adaptation function that may be used by one or more tap update/adaptation units (e.g., tap update units 510, 512, 514). It should be understood that in some embodiments, the tap update units may be combined into a single unit instead of being configured as discrete units as shown in FIG. 5. The following description, and other descriptions herein may refer to an LMS function as one example of an adaptation function, and the various embodiments of the present disclosure may utilize various other adaptation functions. In this respect, the SER-biased adaptation function principals discussed below may be applied to bias other types of adaptation functions, even though LMS is used here to clearly explain one example SER-biased adaptation function.

Various equalizers may utilize an LMS function/algorithm (or LMS criteria) to adapt the equalizer. LMS adaptation may not be optimal in certain situations, for example, in cases of severe multipath. Additionally, LMS adaptation may not seek to achieve minimal symbol error rate (SER) and/or bit error rate (BER). In some embodiments of the present disclosure, DFE core circuit 500 (e.g., in particular tap update units 510, 512, 514) may utilize an SER-biased adaptation function that seeks to minimize SER, and thus may provide optimal performance (perhaps subject to the finite equalizer length). In these embodiments, the SER-biased adaptation function may utilize error vectors in order to determine the probability of symbol error in the system, and thus, a short discussion of error vectors follows.

An error vector (also referred to as an error pattern or error path) indicates the difference between the correct/expected symbol path (e.g., based on correct/expected symbols) and the estimated symbol path (e.g., based on symbols estimated/detected by the receiver). Generally speaking, the correct symbol path corresponds to the transmitted symbol path. Thus, to calculate an error vector, the receiver must know what symbols were transmitted. The receiver may know these symbols because known (or deterministic) symbols are sent and received during initialization or calibration of the system, because preamble symbols are sent periodically through the system, using corrected FEC block that may indicate the errors, or by other methods. The estimated symbol path represents detected or received symbols in the receiver, for example, at the output of the equalization and sequence estimation circuit (e.g., sent to the de-mapper). Received signals from which the estimated symbols are determined may have been convolved by the total partial response, distorted by channel response and then decoded by the equalization and sequence estimation circuit. Both correct symbol paths and the estimated symbol paths are referred to in terms of "paths" or "patterns" or "vectors" because they consist of more than one element (e.g., more than one symbol). The distance between a correct symbol path and an estimated symbol path is an error symbol path or an error vector. Because the partial response shaping (e.g., in the Tx partial response filter and in the Rx filter) increases the number of dimensions in the signal domain, the distance of an error vector is a Euclidian distance. Because partial response is based on convolution and convolution is a linear operation, the error vectors can be used to characterize SER performance of a system, for example, rather than checking error probability for every symbol pattern which may require huge complexity.

As one example, if the correct symbol path (e.g., a known transmitted value) is $[\alpha\ \beta\ \chi\ \delta]$ and the estimated symbol path is $[\alpha\ \alpha\ \alpha\ \alpha]$, then the error vector would be $[(\alpha-\alpha)\ (\alpha-\beta)\ (\alpha-\chi)\ (\alpha-\delta)]/d_{min}$ (estimated symbol path minus correct symbol path normalized to the minimum between two points in symbol constellation ($d_{min}$)). In other words, one could add the error vector (multiplied by $d_{min}$) to the correct/transmitted symbol path to get the estimated symbol path. Thus, the error vector may be referred to as an additive vector (up to scaling by $d_{min}$). The length of an error vector/path may refer to the number of symbols or elements in the error vector/path. It may be the case that an error vector must start and must end with a non-zero element, e.g., the length is 3 in the example above because the first element was not an error. The length of the error vectors/paths may vary based on various factors. The length may be related to the number of taps in the Tx partial response filter, the number of taps in the Rx filter, and/or the size of the symbol constellation (e.g., value of N for an N-QAM constellation), but the length of the error vector may be less than length (L) of the total partial response. It should be understood that there may be as many error vectors as there are possible combinations of correct symbol paths and estimated symbol paths.

Minimum distance in a system is a concept that is closely related to error vectors, in the present disclosure. Symbol distances may refer to the Euclidian distances between different points of the symbol constellation in use. In one or two dimensional modulation schemes which are using symbol slicing (rather than sequence estimation) in the receiver, the minimum distance may refer to the smallest symbol distance that exists in the system. In such schemes minimum distance may be an important metric because it may indicate the likelihood of a symbol slicer arriving at the wrong symbol. In the present system, which uses sequence estimation (rather than symbol slicing), minimum distance may be referenced in terms of multidimensional vector. That is, minimum distance may be measured between paths rather than between constellation points. In the present disclosure, the minimum distance may be defined by one or more particular error vector(s) observed in the system. For example, the minimum distance may be the distance calculated (e.g., via a matrix operation using the filter taps of the of the Tx filter and the Rx filter or via an estimate based on measured SNR) from the error vector that is observed (i.e., occurs) the most frequently in the system. In an example embodiment, the distance of multiple frequently occurring error vectors may be calculated because, for example, there may be some statistical uncertainty regarding whether the most-frequently occurring error vector actually corresponds to the minimum distance.

In some embodiments of the present disclosure, the system may dynamically computes error vectors without the use of known symbols in the receiver. In these embodiments, the "correct" or "expected" symbols may be computed using some sort of error correction scheme, for example, forward error correction (FEC) (e.g., Reed Solomon, or low-density parity check (LDPC)) or another type of correction scheme. The error correction may be performed on the symbols output by the equalization and sequence estimation circuit (e.g., after passing through the de-mapper or following extraction of log likelihood ratios (LLR)). The corrected symbols may then be compared to uncorrected symbols (or corrected symbol paths compared to uncorrected symbol paths) to create error vectors. Thus, various references to "error vectors" herein may refer to error vectors computed dynamically and/or to error vectors computed from known (or deterministic) symbols. SER-biased dynamic error vectors may update "on the fly" as various symbols/symbol paths are output by the equalization and sequence estimation circuit and corrected by the error correction scheme. As one example, the SER-biased adaptation function may update as these dynamic error vectors change on the fly, as explained more below.

The SER-biased adaptation function may utilize an SER expression that may represent a union bound or upper bound of SER in the partial response system. The SER expression may reliably reflect the actual SER of the partial response system, for example, within an error range (e.g., below $10^{-1}$) that provides an adequate margin above the operating zone (e.g., the SER range within which the demodulator or receiver can operate sufficiently without becoming unstable or losing synchronization). The SER expression may drive the loop error used by the tap update units (e.g., similar to how DFE error drives the tap update units in FIG. 5). An example SER expression is provided at Eq. 1 below. The SER expression may represent an upper bound of SER for a system that uses a real pulse shaping filter (e.g., real filter 104 and/or real filter 109) and complex symbols.

$$P_M \leq \sum_{\epsilon_i} Q\left(\sqrt{\frac{d_{min}^2 \delta^2(\epsilon_i)}{2N_0}}\right) 4K_{\epsilon_i} = \qquad (Eq.\ 1)$$

$$\sum_{\epsilon_i} Q\left(\sqrt{\frac{E_S}{N_0}\frac{D}{G_b}\delta^2(\epsilon_i)}\right) 4K_{\epsilon_i}$$

$$K_\epsilon = w_\epsilon \prod_{j=0}^{l-L-1} \frac{\lceil\sqrt{M}\rceil - |\epsilon_j|}{\lceil\sqrt{M}\rceil} \qquad (Eq.\ 2)$$

$$Q(x) = \frac{1}{\sqrt{2\pi}} \int_x^\infty e^{-\frac{u^2}{2}} du \qquad (Eq.\ 3)$$

$$Q'(x) = -\frac{1}{\sqrt{2\pi}} e^{-\frac{x^2}{2}} \qquad (Eq.\ 4)$$

Referring to Eq. 1, $\epsilon_i$ represents error vector i from a subset (e.g., the most commonly observed error vectors) of all the observed error vectors. The subset size may be approximately 10 or less, and other subset sizes may be used in other embodiments and/or situations. As explained above, it may be the case that the error vector that is observed most-frequency in the system is the worst-case error vector. The most-frequently-occurring error vectors may be considered by the SER-biased adaptation function. More particularly, error vectors that appear frequently and have larger weights (e.g., a larger number of errors) may have the most significant impact on system performance (e.g., SER performance). Therefore, the subset of error vectors may include the error vectors with the highest "score", where the score for each error vector considers frequency (e.g., an appearance rate, average appearance rate, or the like) of the error vector and the weight of the error vector. An error vector's score may reflect the impact of the error vector on system performance, and the N (an integer) error vectors having the highest scores may be selected to compose a subset of error vectors. In some embodiments, the subset is determined at configuration/calibration of the system. In other embodiments, the subset may change dynamically, for example, if error vectors are calculated dynamically as explained above. In these other embodiments, the worst-case errors (e.g., frequencies/appearance rates) may vary during operation (e.g., adaptation) of the system. Likewise, error vector scores may vary. In these embodiments, the worst-case error vectors and/or error vector scores may be monitored dynamically (e.g., on the fly) and the subset of error vectors may be updated accordingly.

Referring again to Eq. 1, $\delta^2(\epsilon_i)$ represents the distance (e.g., Euclidian distance) of error vector $\epsilon_i$. As explained above, the worst-case (e.g., most commonly observed) error vector(s) may relate to the minimum distance, and an adaptation goal may be to maintain, restore and/or improve the minimum distance, for example, to improve sequence estimation and reduce SER. M represents the alphabet size and $P_M$ represents the probability of symbol error in an alphabet of size M. D represents a coefficient based on the modulation order of the system. $G_b$ represents the baud rate gain (e.g., spectral compression) of the total partial response. $K_\epsilon$ represents a boundary imposed by a particular error vector, and $K_\epsilon$ may be expanded as shown in Eq. 2 above. $w_\epsilon$ represents the error weight of the error vector (e.g., the number of errors in the error vector). l–L represents the length of the error vector. $\epsilon_j$ represents the jth entry (e.g., symbol) in the error vector. Q represents a Q function or ERF function or other known similar function used in communications. The Q function may be used to quantify the SER, BER, etc. Q may be expanded as shown in Eq. 3 above. The Q function may be derivated to arrive at the Q' function shown in Eq. 4 above.

The SER expression may also be represented as shown below in Eq. 5, where $\hat{h}$ is the adaptive response (e.g., based on total partial response, h). MSE ($\hat{h}$) represents $$\left(\frac{E_S}{N_0}\right)^{-1},$$

for example, factored by equalization noise enhancement.

$$\frac{E_S}{N_0}$$

is related to signal to noise ratio (SNR). In this respect, MSE ($\hat{h}$) may represent the mean square error of the partial response signal within the signal bandwidth including the noise enhancement penalty of equalization. $A(\epsilon_i)$ represents the error vector matrix for error vector $\epsilon_i$. H may represent taking the complex conjugate of $\hat{h}$.

$$P_M \leq \sum_{\epsilon_i} Q\left(\sqrt{\frac{D \cdot (\hat{h})^H A(\epsilon_i)\hat{h}}{MSE(\hat{h})}}\right) 4K_{\epsilon_i} \qquad (Eq.\ 5)$$

The SER expression of Eq. 5 may be minimized by taking its derivative with respect to $\hat{h}$ (the adaptive response). This derivation results in an SER-biased adaptive gradient shown below in Eq. 6.

$$\frac{\partial P_M}{\partial h'} = -2(\hat{h})^H \sum_{\epsilon_i} \frac{K_{\epsilon_i} A(\epsilon_i)}{\delta(\epsilon_i)} e^{-\frac{D\delta^2(\epsilon_i)}{2MSE}} + \qquad (Eq.\ 6)$$

$$\frac{\partial MSE}{\partial \hat{h}} \sum_{\epsilon_i} \frac{K_{\epsilon_i} \delta(\epsilon_i)}{MSE} e^{-\frac{D\delta^2(\epsilon_i)}{2MSE}} = 0$$

The SER-biased adaptive gradient may be used by the tap update/adaptation units (e.g., tap update units 510, 512, 514) to determine updated DFE tap coefficients. For example, Eq. 6 may be solved for ĥ to continuously determine updated DFE tap coefficients. The SER-biased adaptive gradient may be used by the tap update/adaptation units in a similar manner to the way an LMS gradient may be used to update tap coefficients. In general, an LMS gradient may be a function that charts mean square error verses tap coefficients, where the LMS gradient has a single distinct minimum where tap coefficients produce the smallest mean square error. If the gradient has a negative slope, the adaptation function may increase the tap coefficients, and if the gradient has a positive slope, the adaptation function may decrease the tap coefficients. The LMS gradient may be represented by $$\frac{\partial MSE}{\partial \hat{h}},$$

which is part of the right hand expression of Eq. 6. Therefore, it can be seen in Eq. 6 that the SER-biased adaptive gradient considers the impact of the mean square error, but also considers other factors, for example, the impact of error pattern/vector distances. In other words, the Euclidian distance of error patterns is biasing the pure LMS gradient. More specifically, the term $$e^{-\frac{D\delta^2(\epsilon_i)}{2MSE}}$$

balances the gain in the summation according to the error pattern distances $\delta^2(\epsilon_i)$. The gain increases as the distance decreases to reflect that error patterns with small distance are dominant in SER performance. As MSE goes low, the right hand expression becomes dominant because low MSE is associated with high SNR, and high SNR suppresses errors caused by small error pattern distances. Respectively, the left hand term becomes dominant when the error pattern distance ($\delta^2(\epsilon_i)$) becomes small.

In some embodiments, a simplified SER-biased adaptive gradient may be used, for example, a simplified form of the Eq. 6, as shown in Eq. 7 below. The simplified SER-biased adaptive gradient may use the summation terms of Eq. 6 and may exclude the balance terms (i.e., the exponent terms). It may be the case that the balance terms can be removed because the exponent terms do not exhibit a great effect on the overall adaptive gradient, and the remaining terms (the summation terms) still consider the impact of error pattern distances. The simplified SER-biased adaptive gradient may be useful if a simpler adaptive function is desired, for example, if the design is being implemented as hardware and a smaller hardware profile is desired. Additionally, the simplified SER-biased adaptive gradient may allow for faster convergence of the DFE core.

$$\frac{\partial P_M}{\partial h'} \cong -2(\hat{h})^H \sum_{\epsilon_i} \frac{K_{\epsilon_i} A(\epsilon_i)}{\delta(\epsilon_i)} + \frac{\partial MSE}{\partial \hat{h}} \sum_{\epsilon_i} \frac{K_{\epsilon_i} A(\epsilon_i)}{MSE} \quad \text{(Eq. 7)}$$

Figure 8:
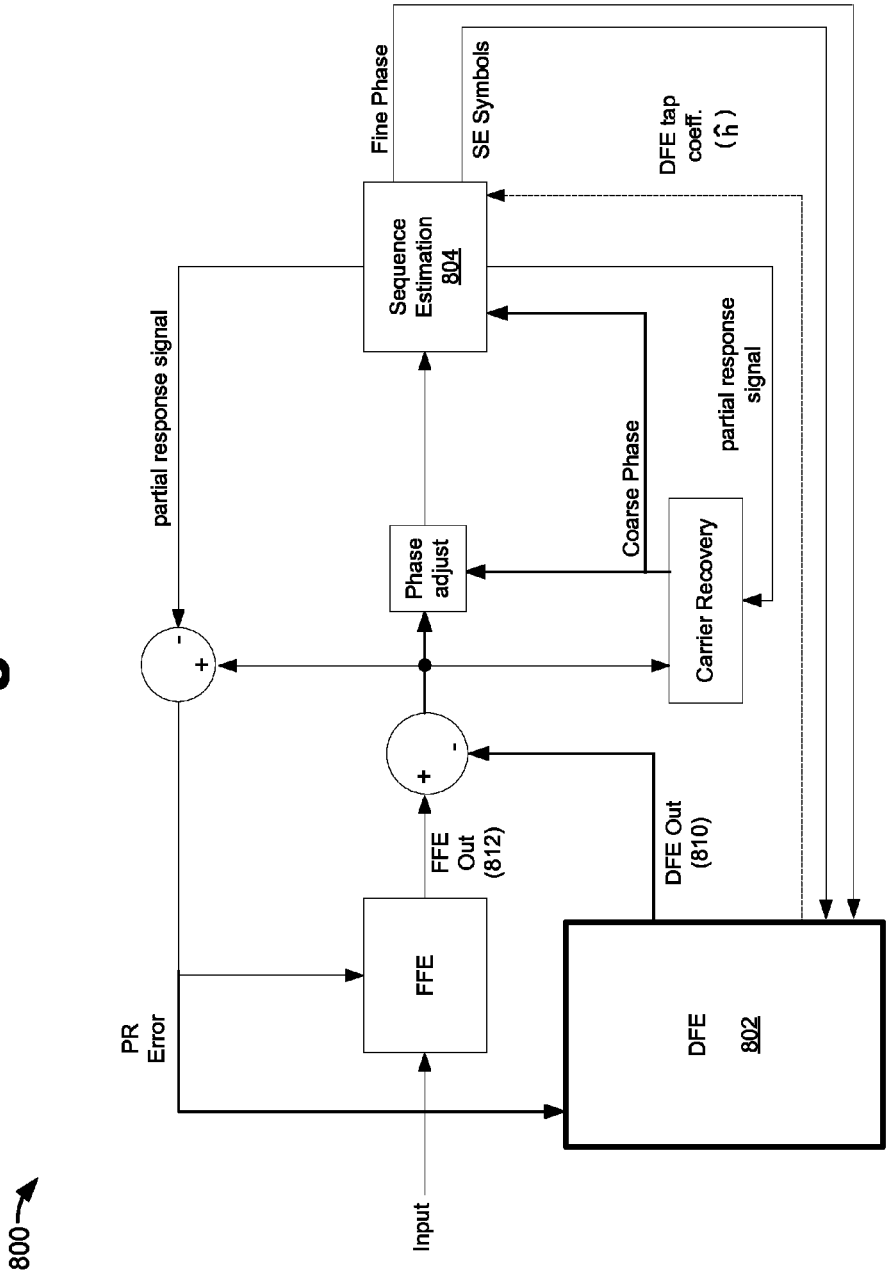
FIG. 8 is a block diagram depicting an example equalization and sequence estimation circuit for use in a system configured for highly-spectrally-efficient communications.

In some embodiments, the transmitter (e.g., pulse shaper 104) may utilize an SER-biased adaptation function for transmitter (i.e., TX) equalization. The TX SER-biased adaptation function may be similar to the SER-biased adaptation function(s) discussed above, for example, in that it may seek to minimize SER (or other system performance indicators). In this respect, the pulse shaper 104, for example, may adapt based on receiver performance indicators such as SER, error vectors, SNR, etc. The transmitter may utilize an SER-biased adaptation function instead of or in conjunction with the receiver using an SER-biased adaptation function. Because h represents the total partial response (e.g., from Tx partial response filter and/or Rx filter), h (which may be used for the sequence estimation in the receiver) may depend on the TX partial response filter. Therefore, the RX filter may be affected (and may need to be modified) if the TX side is modified. The overall optimization of Tx partial response adaptation and Rx filter adaptation may be executed at the receiver side, e.g., where the error vectors that are needed for the SER function evaluation, are generated. The receiver may send to the Tx side adapted, optimized Tx filter tap coefficients that may be used for Tx filter tap adaptation. For example, ĥ(e.g., DFE tap coeff. in FIG. 3 or DFE tap coeff. In FIG. 8) may be sent (e.g., dynamically) to the TX side and used as the response of the Tx filter. In this example implementation, the response being used for the sequence estimation (e.g., in 304 or 804) may be dynamically calculated based on the updated overall response which is based on the convolution of the updated Tx filter coefficients with the Rx filter taps, which may both be known values in the receiver. In some embodiments, the receiver may send to the Tx side an error signal that may be used by the Tx filter for tap adaptation. For example, the value of Tx filter taps at time n+1 may be calculated by the sum of the value of the Tx filter taps at time n modified by the error signal.

Figure 6:
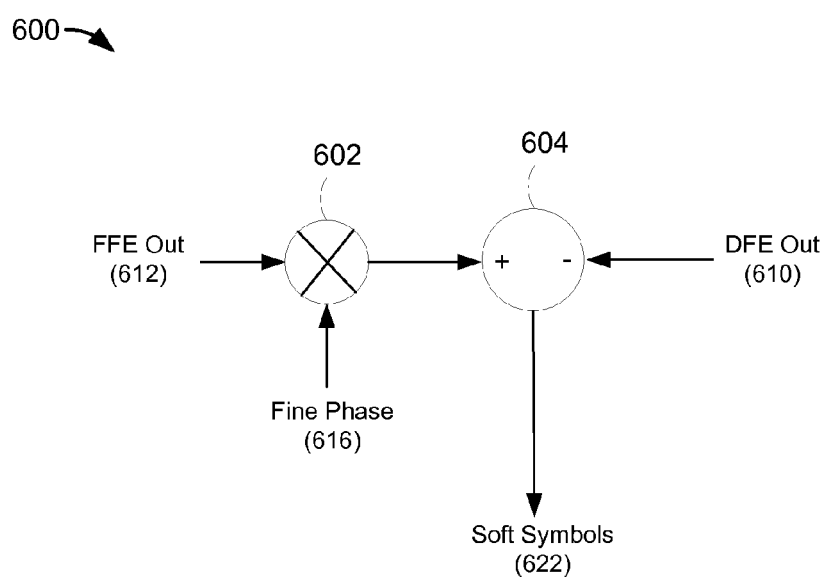
FIG. 6 is a block diagram depicting an example soft symbol determination circuit.

FIG. 6 is a block diagram depicting an example soft symbol determination circuit 600. Soft symbol determination circuit 600 may receive as inputs FFE out 612 (e.g., similar to FFE out 312 as shown in FIG. 3) and DFE out 610 (e.g., similar to DFE out 410 as shown in FIG. 4). DFE out 610 may be generated as a result of symbols (e.g., from the sequence estimation circuit) being convolved with the DFE taps/DFE response. As explained above, DFE out 610 may comprise solely (or primarily) ISI components. FFE out 612 may be the input signal (e.g., input signal 310 to FFE 306 as shown in FIG. 3) after it has been corrected for channel distortions such as noise. Therefore, if the FFE (e.g., 306) was perfect, the FFE out signal 612 would be the same as the signal at the output of the total partial response (e.g., Tx partial response filter and/or Rx filter), for example, where the signal is comprised of symbols with ISI introduced by the total partial response. In other words, if the FFE was perfect, the FFE out signal 612 would be the same as the signal at the input of the Tx partial response filter plus the controlled ISI introduced by the total partial response. Therefore, if the DFE out signal 610 (solely or primarily ISI) is subtracted from the FFE out signal 612 (Tx partial response filter input+ISI), the resulting signal (soft symbols 622) would be, in theory, the input to the Tx partial response filter (i.e., symbols). Soft symbol determination circuit 600 is configured to approximate the Tx partial response filter input based on the theory just described. The soft symbol determination circuit 600 may phase correct/rotate (e.g., using multiplier 602) the FFE out 612 such that it is phase-corrected like the DFE out 610. Soft symbol determination circuit 600 may receive as input a fine phase signal 616 (e.g., fine phase 316 from the sequence estimation circuit 304 as shown in FIG. 3) that may be used to perform the phase correction. The soft symbol determination circuit 600 may subtract (e.g., using subtractor 604) DFE out from the phase-corrected FFE out. In this respect, the ISI (e.g., partial response ISI) may be canceled from the FFE out. The resulting signal (soft symbols 622) may be estimates of the symbols that were sent from the transmitter and estimates of symbols that are output by the ESE circuit (e.g., ESE circuit 300 of FIG. 3). The soft symbols may be used as a quality indication of the symbols output by the ESE circuit. The soft symbols may be used by the DFE to generate and/or determine an error signal for use in the DFE equalizer adaptation. For example, FIG. 4 shows soft symbols 422 being sent to the error determination circuit 406, and the error determination circuit is explained more below.

Figure 7:
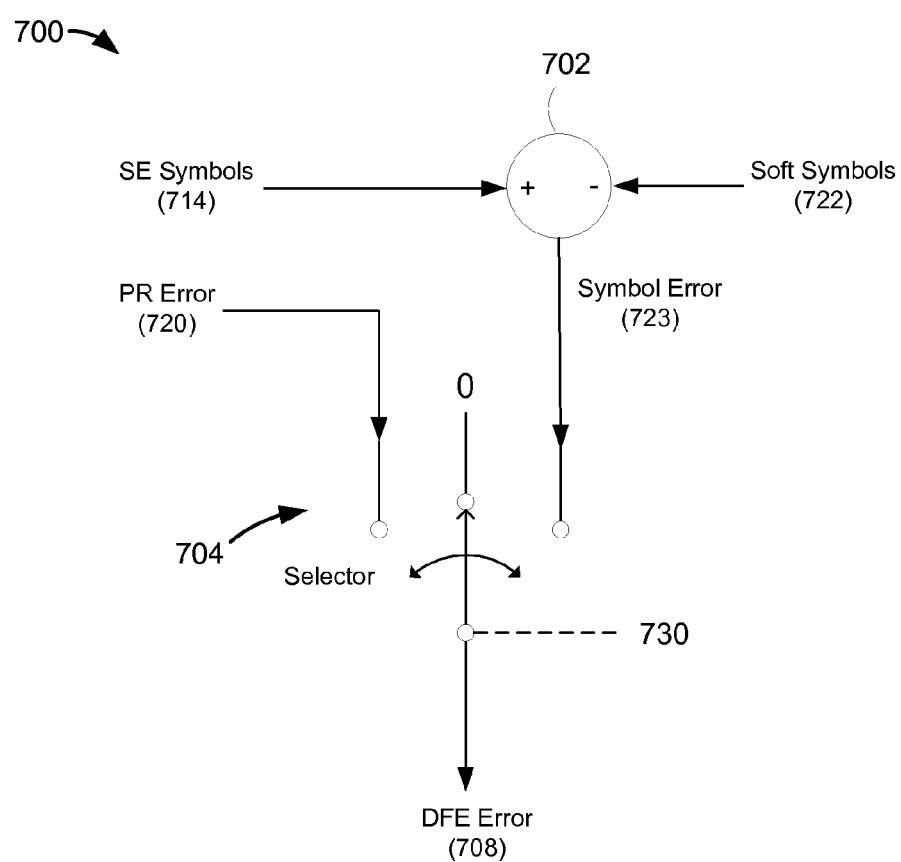
FIG. 7 is a block diagram depicting an example error determination circuit.

FIG. 7 is a block diagram depicting an example error determination circuit 700. Error determination circuit 700 may receive as inputs SE symbols 714 (e.g., SE symbols 314 output by the sequence estimation circuit as shown in FIG. 3), PR error 720 (e.g., PR error 320 as shown in FIG. 3) and/or soft symbols 722 (e.g., soft symbols 422 from the soft symbol determination circuit as shown in FIG. 4). Error determination circuit 700 may generate an error output (e.g., DFE error 708), where the error output may be based on one or more of the inputs and/or other inputs. In the various embodiments of the present disclosure, the error determination circuit may be configurable and may support, for example, one or more configurations that may exclude one or more of the components and/or inputs shown in FIG. 7 and/or one or more configurations that include more components and/or inputs than shown in FIG. 7. In one example configuration, the error determination circuit 700 may simply pass one of the input signals (e.g., PR error 720) through (e.g., without a selector 704 as depicted in FIG. 7) to the DFE error signal 708. In such a configuration, the SE symbols 714 and soft symbols 722 signals may be excluded as inputs, and subtractor 702 may be excluded. In one example configuration, the error determination circuit 700 may connect (e.g., without a selector 704 as depicted in FIG. 7) the symbol error 723 (as shown in FIG. 7) to the DFE error signal 708. In such a configuration, the PR error 720 may be excluded as an input.

In the embodiment depicted in FIG. 7, DFE error output 708 is connected to the output of selector 704. Selector 704 is configurable (e.g., based on a selection signal 730 output by a selector setting register, selector setting circuit or the like) to select between three input signals, and may pass the selected input signal through to the selector output (e.g., DFE error 708). For example, if the selection signal is equal to '0', the selector 704 may select the left-most input (e.g., PR error 720); if the selection signal is equal to '1', the selector 704 may select the center input (e.g., 0); and if the selection signal is equal to '2', the selector 704 may select the right-most input (e.g., symbol error 723). Whichever input is selected by the selector 704 may determine the error signal (e.g., DFE error 708) that is used by the DFE core (e.g., DFE core 402 of FIG. 4) to perform equalization/convergence. In this respect, different configurations of the selector 704 (i.e., different selections of input signals) may be referred to as different error modes. For example, in the first error mode (e.g., selector signal='0'), the DFE may use the PR error 720 as its error signal. In the second error mode (e.g., selector signal='1'), the DFE may use 0 (zero) as its error signal. A zero error signal may indicate that no error signal is to be used by the DFE. In this situation, DFE tap coefficients may be held at their current values (i.e., coefficient freeze). If a coefficient freeze is selected permanently (or for a significant period of time) for DFE operation going forward, the DFE tap coefficients may be set or initialized to tap coefficients corresponding to the total partial response, for example, where the incoming symbols are decimated down to the symbol rate, or to a related partial response such as a shortened version of the total partial response.

In the third error mode (e.g., selector signal='2'), the DFE may use the symbol error 723 generated by the subtractor 702 that receives as inputs SE symbols 714 and soft symbols 722, as shown in FIG. 7. The SE symbols 714 may be output from the sequence estimation circuit (e.g., 304). These SE symbols 714 may be the sequence estimation circuit's best estimation (e.g., given time constraints) of the symbols received from the transmitter and may be the same symbols that are output by the ESE circuit 300 (e.g., to a de-mapper). U.S. patent application having Ser. No. 13/754,964 and titled "Low-Complexity, Highly-Spectrally-Eficient Communications", explains more details about how SE symbols 714 (e.g., similar to signal 132 of FIG. 2) may be more or less error-prone depending on whether signal 132 is taken from a lower or higher indexed element in the symbol buffer. The soft symbols 722 may be output from the soft symbol estimation circuit, based on the DFE out, for example, as shown in FIG. 6. The soft symbols 722 may be estimated symbols that are determined by convolving the SE symbols from the sequence estimation circuit with the DFE taps and then subtracting that output (DFE out) from FFE out (shown in FIG. 6). The soft symbols signal 722 may be used as a quality indication of the symbols output by the sequence estimation circuit, and the symbol error (difference between soft symbols and symbols) may be used as an error signal to drive the DFE equalization/convergence.

In some embodiments, the Symbol error 723 may be used to control (e.g., dynamically) various components in the DFE. For example, Symbol error 723 may control the gain of the DFE (e.g., Gain Err 530 in FIG. 5). As another example, Symbol error 723 may control Selector 704. In one specific implementation, the power of Symbol error 723 may be filtered (e.g., using a FIR or IIR filter structure) to yield an average error power value. The average error power value may be compared to a reference value, and in the case that the average error power value exceeds the reference, this may indicate that the error signal has poor reliability. If the error signal has poor reliability, selector 704 may be switched to a different position (e.g., selector signal='1' to select the zero input). In this situation, the DFE may not adapt (e.g., temporarily) because of the poor reliability of the error signal. When the average error power drops below the reference value, the selector 704 may switch to a different position (e.g., selecting a non-zero error input). In some implementations, DFE gain (e.g., Gain Err 530 in FIG. 5) may change (instead of or in conjunction with the selector changing) if the error signal has poor reliability. For example, the DFE gain value may be reduced to cause the DFE to adapt less, to protect the DFE's response from a poor-reliability error signal. When the average error power drops below the reference value, the DFE gain may increase.

In some embodiments, the selection signal 730 that determines which input of the selector should be passed through to the selector output (e.g., DFE error) may be determined dynamically (e.g., by a selector setting circuit), for example, during the operation of the system and the DFE. For example, the selection signal may change depending on channel conditions (e.g., SNR and/or multipath) or other performance indicators. As one specific example, SNR may be indicated by SNR and/or multipath estimators, and the estimator(s) output(s) may determine the selection of the sector 704. As another example, the selection signal may change depending on equalization performance (e.g., FFE and/or DFE performance), SER performance (e.g., including the performance of the sequence estimation circuit and/or the equalizers). As one specific example, the selection signal may change depending on SER patterns/error vectors. The use of SER patterns/error vectors (e.g., to drive equalizer adaptation) is discussed at various points throughout this disclosure. In some embodiments, the selection signal determination may generally change according to the following rule: if channel conditions are degrading the signal, such that channel distortion is dominant over SER, then the selector may select the PR error, and the DFE may use the PR error to converge; if SER is dominant over channel distortion, then the selector may select the symbol error, and the DFE may use the symbol error as its DFE error signal. Various other selection rules based on these and other performance metrics may be used by the error determination circuit 700.

FIG. 8 is a block diagram depicting an example equalization and sequence estimation (ESE) 800 circuit for use in a system configured for highly-spectrally-efficient communications. ESE 800 may be similar to the equalization and sequence estimation circuit 300 of FIG. 3, for example. As can be seen by comparing FIG. 3 and FIG. 8, several components and connections are similar, but the integration (e.g., certain connections) of DFE 802 into ESE 800 may be different than the integration of DFE 302 into ESE 300. For example, DFE out 810 from DFE 802 may be combined with (e.g., added to) FFE out 812. Additionally, DFE 802 may be different in some respects when compared to DFE 302. As explained above, in some embodiments of the present disclosure, the DFE (e.g., DFE 302 of FIG. 3) may perform biased equalization, meaning that the DFE may compromise between optimally equalizing to correct for signal distortions (e.g., distortions due to multipath, etc.) and achieving other optimization goals such as, for example, improving sequence estimation (e.g., by improving the minimum distance). As an alternative to such a biasing DFE (e.g., 302), a DFE (e.g., 802) may include multiple DFE cores, each of which may comprise a constrained DFE core such as, for example, the DFE core 500 of FIG. 5, an unconstrained DFE core such as the DFE core 1000 of FIG. 10, or a partial DFE core such as, for example, the partial DFE core 1100 of FIG. 11. In an example embodiment, each of the multiple DFE cores may seek to satisfy a different optimization goal.

Figure 9:
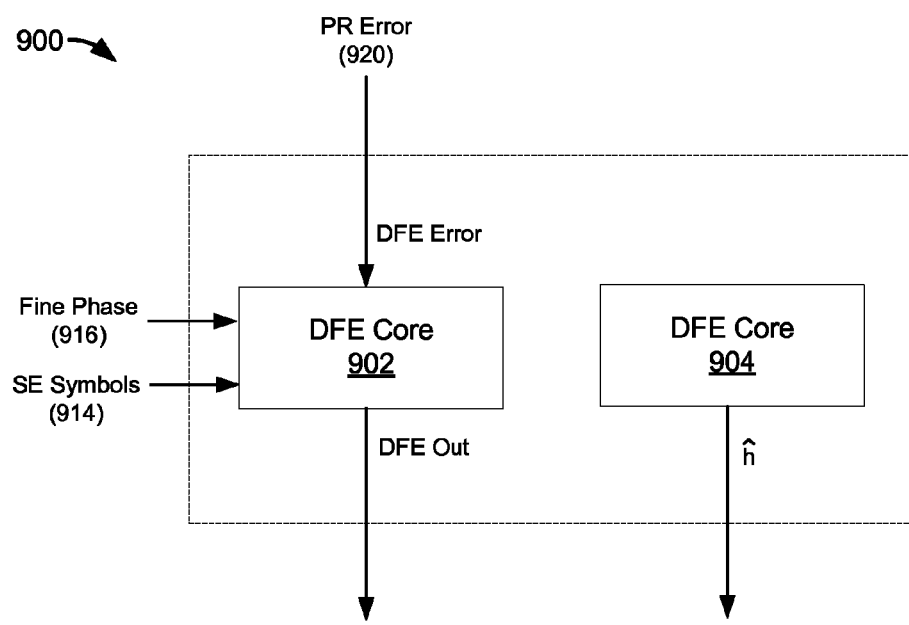
FIG. 9 is a block diagram depicting an example decision feedback equalizer for use in a system configured for highly-spectrally-efficient communications.

FIG. 9 is a block diagram depicting an example DFE circuit 900 for use in a system configured for highly-spectrally-efficient communications. DFE circuit 900 may be similar to DFE circuit 802 of FIG. 8, for example. As can be seen in FIG. 9, DFE circuit 900 includes DFE core 902 and DFE core 904.

In an example embodiment, the DFE core 902 may be used to perform equalization (e.g., using a pure LMS algorithm) to compensate for channel distortions (e.g., multipath). Accordingly, tap coefficients of DFE core 902 may be allowed to adapt (e.g., using an error signal such as PR error 920) in an unconstrained manner (e.g., no constraint function or adaptation function that is biased for SER). In such an example embodiment, the DFE core 902 may be an unconstrained DFE core such as the DFE core 1000 (described below with reference to FIG. 10) and may receive, as inputs, PR error 920, Fine phase 916 and SE symbols 914. These inputs may be similar to the inputs of DFE core 402 of FIG. 4. In an example embodiment, the DFE core 904 may be used to achieve optimal sequence estimation/symbol detection. Accordingly, tap coefficients of the DFE core 904 may be fixed and may replicate or estimate (e.g., be within a determined tolerance of) tap coefficients corresponding to a target response (e.g., h), without any biasing to compensate for channel distortions. In such an example embodiment, the DFE core 904 may be a partial DFE core such as the DFE core 1100 (described below with reference to FIG. 11).

In an example embodiment, the DFE core 904 may perform adaptation (e.g., using an LMS type algorithm) to maximize the minimum distance (and/or minimize SER), without considering the effect of mean square error (e.g., channel distortions). In this respect, the minimum distance in the receiver (associated with h) may improve beyond the minimum distance in the transmitter (associated with ĥ). In this embodiment, DFE core 904 may include more circuitry beyond just registers (and associated circuitry) that hold tap coefficients. For example, DFE core 904 may include circuitry that may implement an optimization function (e.g., an optimization function that is similar to Eq. 5 explained above). For example, the optimization function may receive as input a number of error vectors, and the optimization function may consider the minimum distance (e.g., Euclidian distance) corresponding to the error vectors. The optimization function may seek to set the tap coefficients of the DFE core 904 to values that maintain, restore or improve the minimum distance. As a result, the optimization function may seek to set the tap coefficients of the DFE core 904 to values that are optimal for sequence estimation, symbol detection and minimal SER. Unlike the optimization function of Eq. 5, this optimization function may not consider error arising due to channel distortions (e.g., multipath). For example, in this embodiment, DFE core 904 may not receive PR error as an input and may not considering the effect of the mean square of PR error. In other words, the optimization function may not compromise to achieve minimum PR error. In this respect, the optimization function may be focused on improved SER, and the minimum distance (associated with taps values corresponding to ĥ) may improve beyond the original minimum distance (associated with tap values corresponding to h).

Figure 10:
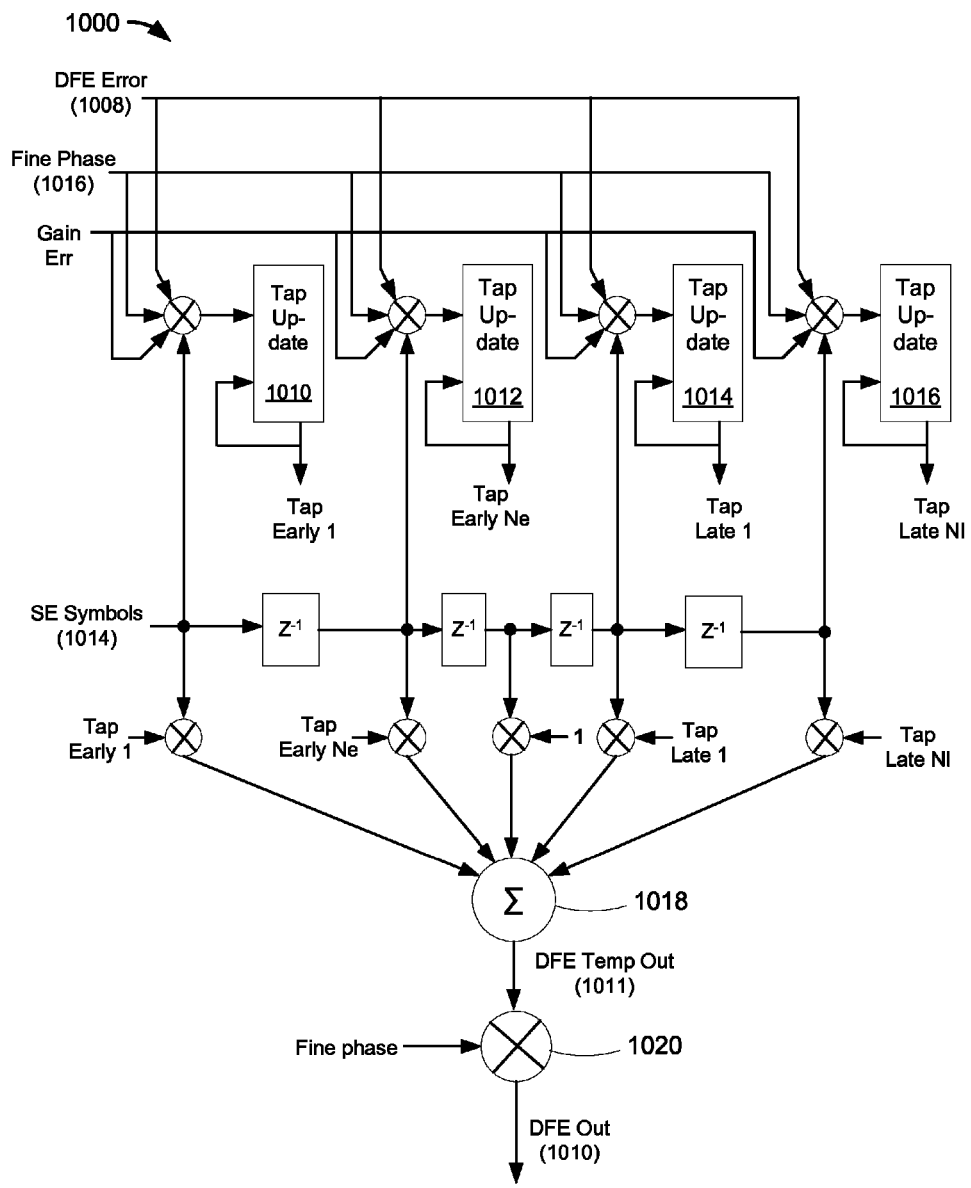
FIG. 10 is a block diagram depicting an example decision feedback equalizer core circuit.

FIG. 10 is a block diagram depicting an example unconstrained DFE core circuit 1000, for example, an unconstrained DFE core that may be used as DFE 902 in the embodiment of FIG. 9. As can be seen in FIG. 10, unconstrained DFE core 1000 may include various components and connections that are similar to those of the constrained DFE core 500 of FIG. 5. Unlike the constrained DFE core 500 of FIG. 5, the unconstrained DFE core 1000 may not have a constraint function or constraints feeding into the tap update units. Unconstrained DFE core 1000 may have a similar set of delay elements and may use similar tap adaptation function(s); however, the adaptation functions (e.g., in tap update units 1010, 1012, 1014, 1016) may be unconstrained. In this respect, unconstrained DFE core 1000 may be allowed to adapt (e.g., using an error signal such as PR error) in an unconstrained manner (e.g., no constraint function, constraints or adaptation function that is biased for SER).

DFE core 1000 may generate a DFE out signal 1010 as shown in FIG. 10. DFE out 1010 may be generated by rotating a DFE temporary out signal 1011 (output of accumulator 1018) using multiplier 1020. The fine phase signal 1016 may be used to perform the rotation. Similar to the constrained DFE core 500 described with regard to FIG. 5, a phase correction (e.g., using fine phase 1016) of DFE error 1008 may be required in unconstrained DFE core 1000 such that DFE error is phase aligned with the SE symbols 1014, which have been generated using a phase corrected signal. Therefore, the DFE temp out signal 1011 will be phase corrected. However, the DFE out signal 1010 must be rotated (e.g., using fine phase) such that DFE out 1010 can be combined with (e.g., added) FFE out (an uncorrected signal), for example, as shown in FIG. 8.

Figure 11:
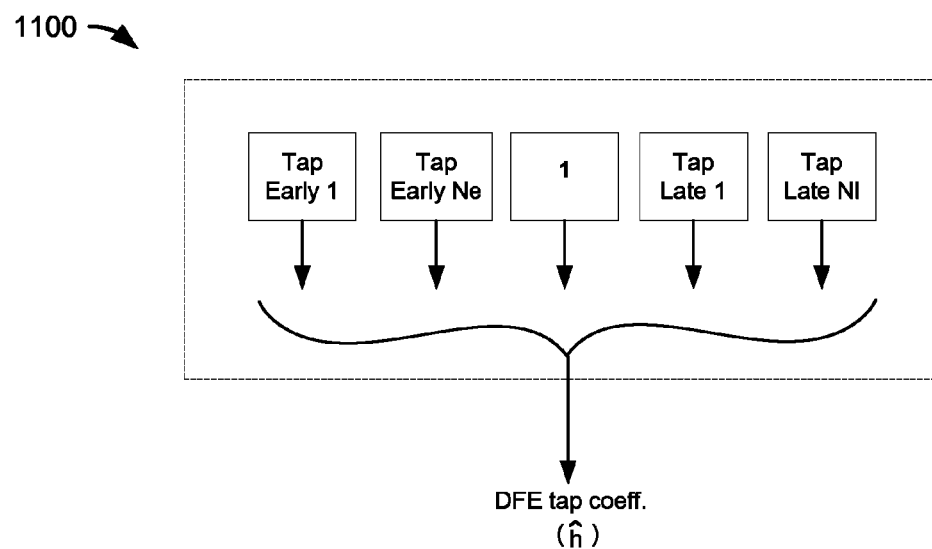
FIG. 11 is a block diagram depicting an example decision feedback equalizer core circuit.

FIG. 11 is a block diagram depicting an example partial DFE core circuit 1100, for example, a partial DFE core that may be used as DFE core 904 in the embodiment of FIG. 9. Partial DFE core 1100 may include a number of taps the coefficients of which correspond to the response $\hat{h}$ which replicates or estimates the total partial response h. In the embodiment of FIG. 11, partial DFE core 1100 may comprise registers that hold tap coefficients (e.g., Tap Early 1, Tap Early Ne, Tap Late 1, Tap Late Nl). The register(s) of DFE core 1000 may update, for example, if the total partial response (e.g., h) changes. The tap coefficients $\hat{h}$ of partial DFE core 1100 may be sent to (and used by) a sequence estimation circuit (e.g., sequence estimation circuit 804 of FIG. 8), as explained further herein. In some alternate embodiments of the present disclosure, the registers of the partial DFE core 1100 may reside, for example, in the sequence estimation circuit, and it may be unnecessary for the DFE (e.g., DFE 802 of FIG. 8) to send the tap coefficients corresponding to $\hat{h}$ to the sequence estimation circuit (e.g., circuit 804).

Certain embodiments of the present disclosure may be found in one or more methods for a decision feedback equalizer utilizing symbol error rate biased adaptation function for highly-spectrally-efficient communications. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

Figure 12A:
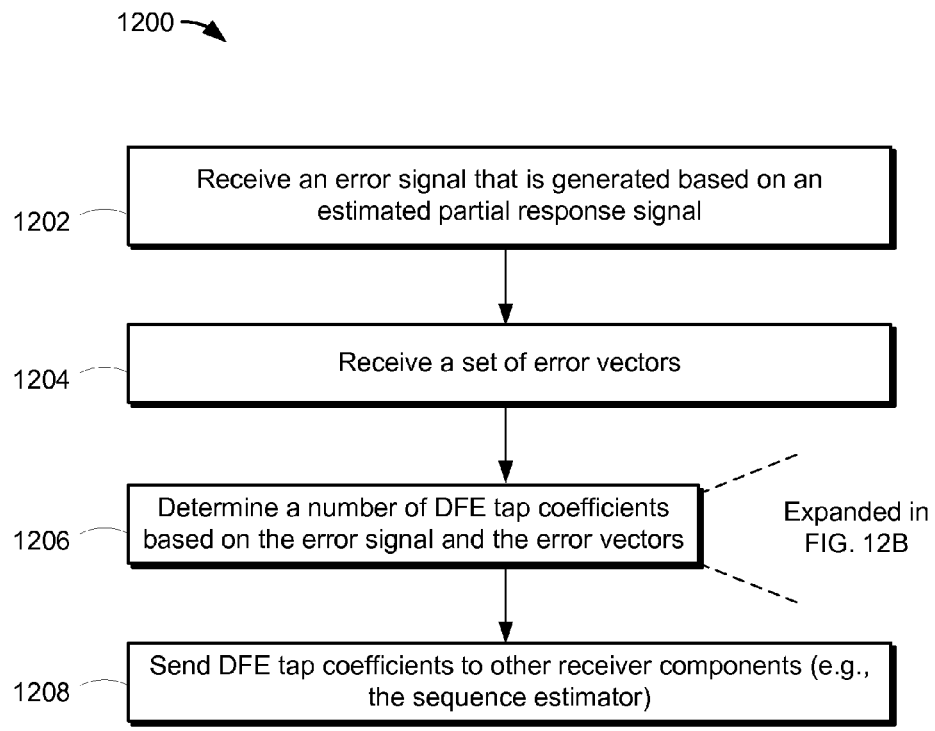
FIG. 12A is a flow diagram depicting example steps in a method for a decision feedback equalizer utilizing symbol error rate biased adaptation function for highly-spectrally-efficient communications.

FIG. 12A depicts a flow diagram 1200 that shows example steps in a method for a decision feedback equalizer utilizing symbol error rate biased adaptation function for highly-spectrally-efficient communications, in accordance with one or more embodiments of the present disclosure. More specifically, FIG. 12A shows example steps that may be performed to determine DFE tap coefficients, for example, DFE tap coefficients Tap Early 1, Tap Early Ne, Tap Late 1, Tap Late Nl in a DFE core similar to DFE core 500. At step 1202, a DFE core may receive an error signal (e.g., DFE error 508) that is generated based on an estimated partial response signal. At step 1204, the DFE core may receive a set of error vectors, as explained in more detail above. At step 1206, the DFE core may determine a number of DFE tap coefficients based on the error signal and the error vectors. Step 1206 may be expanded, in some example embodiments, to include additional steps, for example, the steps shown in FIG. 12B. At step 1208, the DFE core may send the DFE tap coefficients to other receiver components (e.g., the sequence estimator 304). The steps of FIG. 12A may repeat and/or reoccur throughout the operation of the system. For example, the determination of the DFE tap coefficients (e.g., step 1206) may occur dynamically, such that the DFE tap coefficients are modified when relevant inputs (e.g., the error signal and/or the error vectors) change.

Figure 12B:
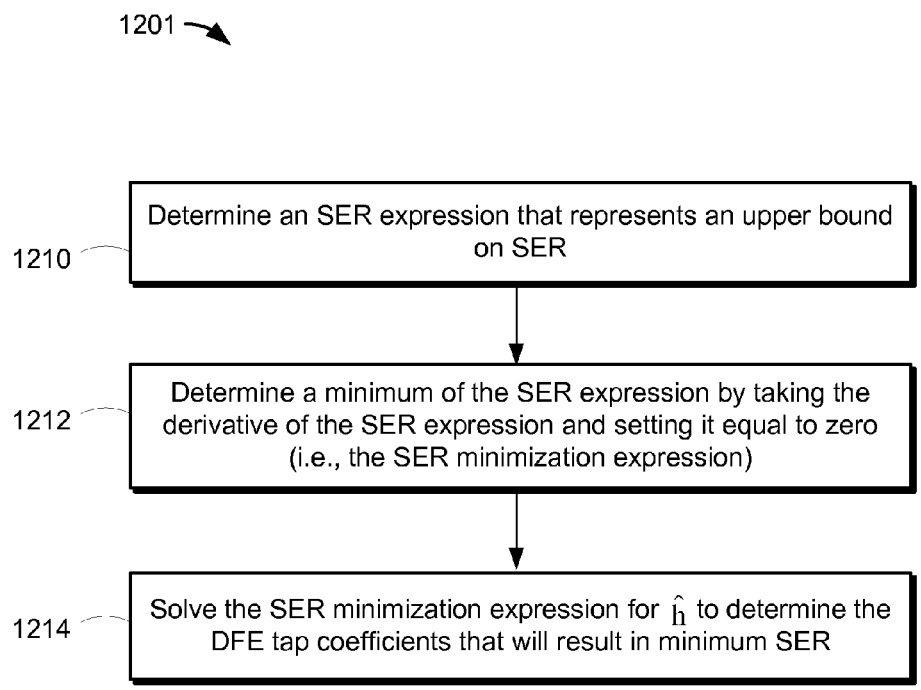
FIG. 12B is a flow diagram depicting example steps in a method for a decision feedback equalizer utilizing symbol error rate biased adaptation function for highly-spectrally-efficient communications.

FIG. 12B depicts a flow diagram 1201 that shows example steps in a method for a decision feedback equalizer utilizing symbol error rate biased adaptation function for highly-spectrally-efficient communications, in accordance with one or more embodiments of the present disclosure. More specifically, FIG. 12B shows an expanded segment of flow diagram 1200 of FIG. 12A. The expanded segment can be seen as indicated in FIG. 12A, specifically, step 1206. At step 1210, a DFE core may determine an SER expression that represents an upper bound on SER in the system. At step 1212, the DFE core may determine a minimum of the SER expression by taking the derivative of the SER expression and setting it equal to zero. The resulting expression may be referred to as the "SER minimization expression." At step 1214, the DFE core may solve the SER minimization expression for $\hat{h}$ to determine the DFE tap coefficients that will result in minimum SER in the system.

Various embodiments of the present disclosure describe one or more systems, methods, routines and/or techniques a decision feedback equalizer utilizing symbol error rate biased adaptation function for highly spectrally efficient communications. In one or more embodiments, a method may be performed in a decision feedback equalizer (DFE). The method may include determining values of tap coefficients used by the DFE. The values of the tap coefficients may be determined based on an error signal that is based on an estimated inter-symbol-correlated (ISC) signal. The values of the tap coefficients may be determined based on a set of error vector(s), where each error vector in the set represents a difference between estimated symbols generated in the receiver and expected symbols. The ISC signal may be a partial response signal. The ISC signal may be generated by a sequence estimation circuit. The set of error vector(s) may be a subset of a larger set of error vectors calculated in the receiver, and the subset may include error vector(s) observed most frequently in the receiver. Determining the values of the tap coefficients may include using a symbol error rate function that estimates the actual symbol error rate in the receiver, wherein the symbol error rate function may receive as input the set of error vector(s). The symbol error rate function may include one or more terms that represent the Euclidian distance of each error vector in the set of error vector(s). Determining the values of the tap coefficients may include seeking a minimum of the symbol error rate function. In some embodiments, one or more error vectors in the set of error vector(s) represent(s) distance(s) between symbol paths of transmitted values. The expected symbols may be the symbols as sent by a transmitter. The expected symbols may be the symbols as determined by an error correction unit.

One or more embodiments of the present disclosure describe a system that includes circuitry that further includes a decision feedback equalizer (DFE). The circuitry may be operable to determine values of tap coefficients used by the DFE. The values of the tap coefficients may be based on an error signal that is based on an estimated inter-symbol-correlated (ISC) signal. The values of the tap coefficients may be based on a set of error vector(s), where each error vector in the set represents a difference between estimated symbols generated in the receiver and expected symbols. The set of error vector(s) may be a subset of a larger set of error vectors calculated in the receiver, and the subset may include error vector(s) observed most frequently in the receiver. In some embodiments, the determination of the values of the tap coefficients includes use of a symbol error rate function that provides an estimation for the actual symbol error rate in the receiver, and the symbol error rate function may receive as input the set of error vector(s). The symbol error rate function may include one or more terms that represent the Euclidian distance of each error vector in the set of error vector(s). The determination of the tap coefficients may include seeking a minimum of the symbol error rate function. In some embodiments, one or more error vectors in the set of error vector(s) represent(s) distance(s) between symbol paths of transmitted values.

One or more embodiments of the present disclosure describe a decision feedback equalizer (DFE) in a receiver. The decision feedback equalizer may include a plurality of tap coefficients that are determined, at least in part, based on a function that seeks to minimize the mean square of an error signal. The plurality of tap coefficients may be determined, at least in part, based on a set of error vector(s), where each error vector in the set represents a difference between estimated symbols generated in the receiver and expected symbols. The expected symbols may be the symbols as sent by a transmitter. The expected symbols may be the symbols as determined by an error correction unit such that the symbols as sent by the transmitter need not be known. In some embodiments, the one or more error vectors in the set of error vector(s) may be dynamically computed by determining the difference between the estimated symbols generated in the receiver and the expected symbols. The decision feedback equalizer may include one or more tap update units that use a symbol error rate function that represents an estimation of the actual symbol error rate in the receiver. The symbol error rate function may receive as inputs the error signal and the set of error vector(s). The symbol error rate function may include an input that represents a signal to noise ratio in the receiver, and the tap coefficients may be updated dynamically as the signal to noise ratio input varies.

One or more embodiments of the present disclosure describe a method performed in a transmitter. The method may include receiving information from a receiver, the information being based on a function that estimates symbol error rate (SER) in a receiver. The function may use a set of error vector(s), where each error vector in the set represents a difference between estimated symbols generated in the receiver and expected symbols. The method may include generating an inter-symbol-correlated (ISC) signal based on the information. The method may include sending the ISC signal to the receiver where the receiver processes the ISC signal using the function that estimates SER. The information may be an error signal that is generated in the receiver based on the function. The information may be values of tap coefficients generated in the receiver based on the function. In some embodiments, the ISC signal is a partial response signal. In some embodiments, generating the ISC signal includes convolving symbols to be transmitted by the transmitter with tap coefficients inside a pulse shaping filter, wherein the pulse shaping filter is located within the transmitter and is configured for a partial response system.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method comprising, in a decision feedback equalizer (DFE) included in a receiver:
   determining values of tap coefficients used by the DFE based on:
   an error signal that is based on an estimated inter-symbol-correlated (ISC) signal; and
   a set of error vector(s), where each error vector in the set represents a difference between estimated symbols generated in the receiver and expected symbols,
   wherein determining the values of the tap coefficients includes using a symbol error rate function that estimates the actual symbol error rate in the receiver, wherein the symbol error rate function receives as input the set of error vector(s).

2. The method of claim 1, wherein the ISC signal is a partial response signal.

3. The method of claim 2, wherein the ISC signal is generated by a sequence estimation circuit.

4. The method of claim 1, wherein the set of error vector(s) is a subset of a larger set of error vectors calculated in the receiver, and wherein the subset includes error vector(s) observed most frequently in the receiver.

5. The method of claim 1, wherein the symbol error rate function includes one or more terms that represent the Euclidian distance of each error vector in the set of error vector(s).

6. The method of claim 1, wherein determining the values of the tap coefficients includes seeking a minimum of the symbol error rate function.

7. The method of claim 6, wherein one or more error vectors in the set of error vector(s) represent(s) distance(s) between symbol paths of transmitted values.

8. The method of claim 1, wherein the expected symbols are the symbols as sent by a transmitter.

9. The method of claim 1, wherein the expected symbols are the symbols as determined by an error correction unit.

10. A system comprising:
    circuitry that includes a decision feedback equalizer (DFE), wherein the circuitry is operable to:
    determine values of tap coefficients used by the DFE based on:
    an error signal that is based on an estimated inter-symbol-correlated (ISC) signal; and
    a set of error vector(s), where each error vector in the set represents a difference between estimated symbols generated in the receiver and expected symbols,
    wherein the determination of the values of the tap coefficients includes use of a symbol error rate function that provides an estimation for the actual symbol error rate in the receiver, and wherein the symbol error rate function receives as input the set of error vector(s).

11. The system of claim 10, wherein the set of error vector(s) is a subset of a larger set of error vectors calculated in the receiver, and wherein the subset includes error vector(s) observed most frequently in the receiver.

12. The system of claim 10, wherein the symbol error rate function includes one or more terms that represent the Euclidian distance of each error vector in the set of error vector(s).

13. The system of claim 10, wherein the determination of the tap coefficients includes seeking a minimum of the symbol error rate function.

14. The system of claim 13, wherein one or more error vectors in the set of error vector(s) represent(s) distance(s) between symbol paths of transmitted values.

15. The system of claim 10, wherein the ISC signal is a partial response signal.

16. The system of claim 10, wherein the expected symbols are the symbols as sent by a transmitter.

17. The system of claim 16, wherein:
    the circuitry comprises a sequence estimation circuit; and
    the ISC signal is generated by the sequence estimation circuit.

18. A decision feedback equalizer (DFE) in a receiver, the decision feedback equalizer comprising:

a plurality of tap coefficients that are determined, at least in part, based on a function that seeks to minimize the mean square of an error signal and, at least in part, based on a set of error vector(s), where each error vector in the set represents a difference between estimated symbols generated in the receiver and expected symbols; and one or more tap update units that use a symbol error rate function that represents an estimation of the actual symbol error rate in the receiver, wherein the symbol error rate function receives as inputs the error signal and the set of error vector(s).

19. The decision feedback equalizer of claim 18, wherein the expected symbols are the symbols as sent by a transmitter.

20. The decision feedback equalizer of claim 18, wherein the expected symbols are the symbols as determined by an error correction unit such that the symbols as sent by the transmitter need not be known.

21. The decision feedback equalizer of claim 20, wherein the one or more error vectors in the set of error vector(s) are dynamically computed by determining the difference between the estimated symbols generated in the receiver and the expected symbols.

22. The decision feedback equalizer of claim 18, wherein the symbol error rate function includes an input that represents a signal to noise ratio in the receiver, and wherein the tap coefficients are updated dynamically as the signal to noise ratio input varies.

23. The decision feedback equalizer of claim 18, wherein the ISC signal is a partial response signal.

24. A method comprising, in a transmitter:
receiving information from a receiver, the information being based on a function that estimates symbol error rate (SER) in a receiver, wherein the function uses a set of error vector(s), where each error vector in the set represents a difference between estimated symbols generated in the receiver and expected symbols;

generating an inter-symbol-correlated (ISC) signal based on the information; and sending the ISC signal to the receiver where the receiver processes the ISC signal using the function that estimates SER.

25. The method of claim 24, wherein the information is an error signal that is generated in the receiver based on the function.

26. The method of claim 24, wherein the information is values of tap coefficients generated in the receiver based on the function.

27. The method of claim 24, wherein the ISC signal is a partial response signal, and wherein generating the ISC signal includes convolving symbols to be transmitted by the transmitter with tap coefficients inside a pulse shaping filter, wherein the pulse shaping filter is located within the transmitter and is configured for a partial response system.

28. The system of claim 24, wherein the expected symbols are the symbols as sent by a transmitter.

29. The system of claim 24, wherein the expected symbols are the symbols as determined by an error correction unit.

30. The decision feedback equalizer of claim 29, wherein:
the circuitry includes a sequence estimation circuit; and
the ISC signal is generated by the sequence estimation circuit.

* * * * *